(12) United States Patent
Tamaki

(10) Patent No.: US 8,708,783 B2
(45) Date of Patent: Apr. 29, 2014

(54) APPARATUS FOR HANGING SAUSAGE ON ROD AND METHOD OF HANGING SAUSAGE ON ROD

(71) Applicant: Takumigiken Corporation, Wakayama (JP)

(72) Inventor: Kanji Tamaki, Wakayama (JP)

(73) Assignee: Takumigiken Corporation, Wakayama (JP)

( * ) Notice: Subject to any disclaimer, the term of this patent is extended or adjusted under 35 U.S.C. 154(b) by 0 days.

(21) Appl. No.: 13/948,562

(22) Filed: Jul. 23, 2013

(65) Prior Publication Data

US 2014/0030971 A1 Jan. 30, 2014

(30) Foreign Application Priority Data

Jul. 25, 2012 (JP) .................................. 2012-164568

(51) Int. Cl.
*A22C 11/00* (2006.01)

(52) U.S. Cl.
USPC ............................................................ 452/51

(58) Field of Classification Search
USPC ................... 452/30–35, 46–48, 51, 183, 186
See application file for complete search history.

(56) References Cited

U.S. PATENT DOCUMENTS

| | | | |
|---|---|---|---|
| 5,163,864 A * | 11/1992 | Burger et al. | 452/51 |
| 6,290,591 B1 * | 9/2001 | Hergott et al. | 452/51 |
| 6,592,452 B1 * | 7/2003 | Myers | 452/51 |
| 7,249,997 B2 * | 7/2007 | Kasai | 452/51 |
| 7,347,772 B2 * | 3/2008 | Lebsack et al. | 452/177 |
| 7,588,485 B1 * | 9/2009 | Nakamura et al. | 452/51 |
| 8,113,924 B2 * | 2/2012 | Nakamura et al. | 452/32 |
| 8,151,973 B2 * | 4/2012 | Borkiewicz et al. | 198/465.4 |
| 8,342,318 B2 * | 1/2013 | Knodel | 198/683 |
| 8,556,687 B2 * | 10/2013 | Meyrahn et al. | 452/31 |
| 2005/0159093 A1 | 7/2005 | Kasai | |

FOREIGN PATENT DOCUMENTS

| | | |
|---|---|---|
| JP | 8-38032 | 2/1996 |
| JP | 2003-70416 | 3/2003 |
| JP | 2006-197935 | 8/2006 |

OTHER PUBLICATIONS

European Search Report issued Aug. 20, 2013 in corresponding European Application No. 13 17 7264.

* cited by examiner

*Primary Examiner* — Richard Price, Jr.
(74) *Attorney, Agent, or Firm* — Wenderoth, Lind & Ponack, L.L.P.

(57) ABSTRACT

An apparatus is provided for hanging sausage on a rod that does not need the task for suspending sausage on hooks to be paused when a chain of sausages hung on a rod is to be removed or when closure processing is to be performed on the front end portion or the rear end portion of a chain of sausages. Hook units are transferred and each include: a unit body that moves along a rail; a rod portion that is rotatably supported to the unit body and has attached thereto a hook portion at one end for hanging a joining portion of the chain of sausages, and a support portion that supports the chain of sausages suspended on the hook portion; and a rod receiving portion that is attached to the unit body, and has formed thereon a recessed portion in which a rod is to be placed.

19 Claims, 18 Drawing Sheets

Fig. 4A
Fig. 4B
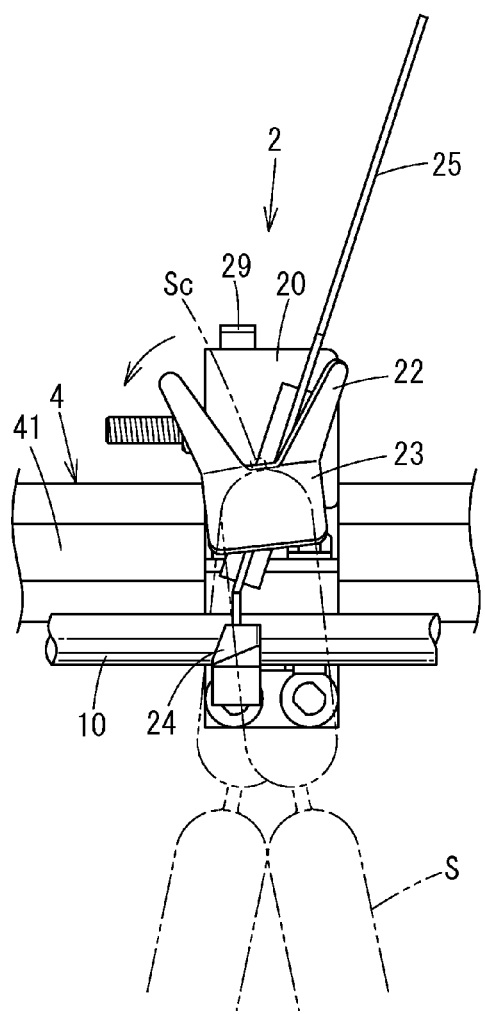
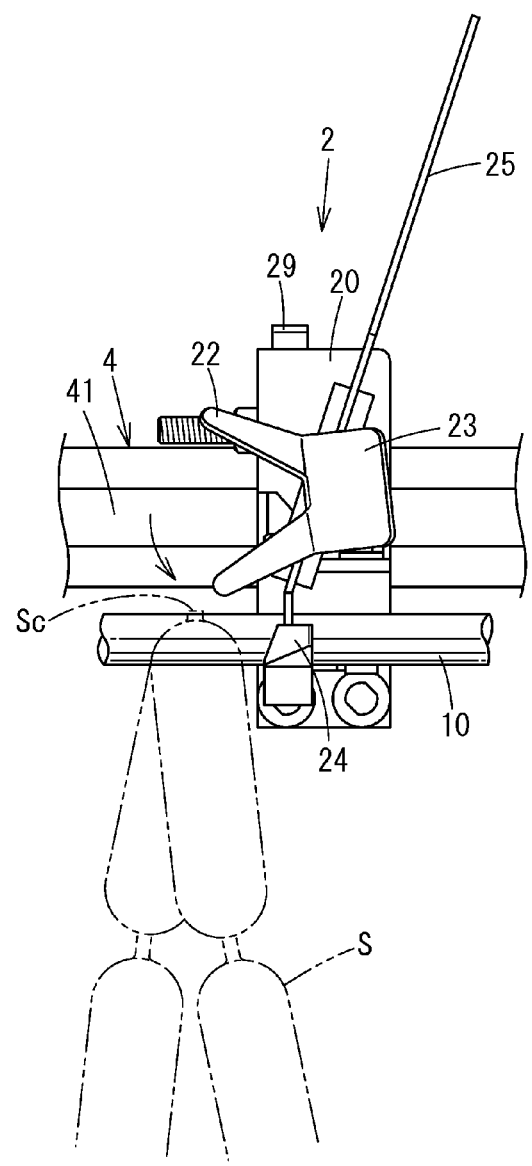

APPARATUS FOR HANGING SAUSAGE ON ROD AND METHOD OF HANGING SAUSAGE ON ROD

BACKGROUND OF THE INVENTION

1. Field of the Invention

The present invention relates to an apparatus for hanging sausage on a rod and a method of hanging sausage on a rod, which are for hanging a chain of sausages on a rod in loops.

2. Description of the Related Art

In a chain of sausages, sausages are connected in a chain-like manner via joining portions provided at a regular interval in a casing created from the skin of an intestine or the like. With an apparatus for manufacturing a chain of sausages, a chain of sausages is created by stuffing ingredients (minced meat and the like) into a casing with a meat filling device and twisting the casing at a predetermined interval, and then the chain of sausages is hung in loops on a rod for hot smoking. A separate carriage equipped with many rod hanging portions is prepared, rods with sausage hung thereon are then manually hung one after another on the hanging portions of the carriage by a worker, and then the carriage is moved to a smoking room in order to smoke the sausage.

The task of hanging chains of sausages on rods for smoking in the above series of tasks has thus far been performed by hand, and this not only of course requires a worker to be retained, but also is poor in terms of workability and causes a reduction in the efficiency of the smoking task. For this reason, an apparatus for hanging sausage on a rod that automatically and speedily performs the task of hanging a chain of sausages on a rod in loops has been developed and put into actual use (e.g., see Patent Document 1: JP 2006-197935A).

With the apparatus for hanging sausage on a rod disclosed in Patent Document 1, loops are formed in a chain of sausages using hooks attached to a conveyor (an endless rotating member) at a predetermined interval, and the chain of sausages is hung on a rod by inserting the rod through the loops.

Meanwhile, since a predetermined number of loops are to be hung on a rod at one time in the task for hanging sausage on a rod, when one rod-worth of hooks has a chain of sausages suspended thereon, the worker severs a joining portion of the sausage and performs closure processing to prevent the ingredients from leaking out from the severed location.

Also, since the length of the chain of sausages created by the sausage manufacturing apparatus is not constant, there are cases where the end of a chain of sausages is reached before one rod-worth of a chain of sausages has been suspended on hooks. In such a case, the worker performs closure processing on the rear end portion of the chain of sausages suspended on hooks, and performs closure processing on the front end portion of the chain of sausages coming out of the sausage manufacturing apparatus, and then severs a joining portion and performs closure processing when one rod-worth of hooks has a chain of sausages suspended thereon.

Since the hooks are attached to the conveyor at a predetermined interval in the apparatus for hanging sausage on a rod disclosed in Patent Document 1 described above, when a chain of sausages hung on a rod is to be removed, it is necessary to stop the conveyor and pause the task for suspending sausage on hooks. Similarly, when closure processing is to be performed on the front end portion or the rear end portion of a chain of sausages as well, it is necessary to stop the conveyor and pause the task for suspending sausage on hooks, which causes a reduction in the operating rate of the apparatus for hanging sausage on a rod.

BRIEF SUMMARY OF THE INVENTION

The present invention has been achieved in light of the above-described problems, and an object thereof is to provide an apparatus for and method of hanging sausage on a rod that do not need the task for suspending sausage on hooks to be paused when a chain of sausages hung on a rod is to be removed or when closure processing is to be performed on the front end portion or the rear end portion of a chain of sausages.

In order to achieve the aforementioned object, an apparatus for hanging sausage on a rod according to the present invention is an apparatus for hanging sausage on a rod by suspending a chain of sausages, including individual sausages linked by a joining portion, so as to form loops on a plurality of hook units that move along an endless path, and by transferring the suspended chain of sausages from the hook units to a rod inserted into the loops, the hook units being transferred individually or as a group,
the hook units each including:
a unit body that moves along the path;
a rod portion that is rotatably supported to the unit body and has attached thereto a hook portion at one end for hanging the joining portion of the chain of sausages, and a support portion that supports the chain of sausages suspended on the hook portion while keeping an angle of the chain of sausages; and
a rod receiving portion that is attached to the unit body so as to be positioned lower than the hook portion, and has formed thereon a recessed portion in which the rod is to be placed, and
the chain of sausages being hung on the rod by rotating the rod portions of a group of hook units having a chain of sausages of a length for hanging on one rod suspended on the hook portions, and having the rod held in the rod receiving portions, so as to cause the chain of sausages suspended on the hook portions to fall onto the rod.

In order to achieve the aforementioned object, a method of hanging sausage on a rod according to the present invention is a method of hanging sausage on a rod by suspending a chain of sausages, including individual sausages linked by a joining portion, so as to form loops on a plurality of hook units that move along an endless path, and by transferring the suspended chain of sausages from the hook units to a rod inserted into the loops, the hook units being transferred individually or as a group,
the hook units each including:
a unit body that moves along the path;
a rod portion that is rotatably supported to the unit body and has attached thereto a hook portion at one end for hanging the joining portion of the chain of sausages, and a support portion that supports the chain of sausages suspended on the hook portion while keeping an angle of the chain of sausages; and
a rod receiving portion that is attached to the unit body so as to be positioned lower than the hook portion, and has formed thereon a recessed portion in which the rod is to be placed,
the method comprising:
arranging a first group of hook units on an upstream side in a movement direction, a chain of sausages being suspended on the hook portions in the first group of hook units, and the number of hook units in the first group corresponding to a chain of sausages of a length for hanging on one rod,
arranging a second group of hook units on a downstream side in the movement direction, a chain of sausages suspended on the hook portions in the second group of hook units having been removed, a rod being placed in the rod receiving portions in the second group of hook units, and the number of hook units in the second group corresponding to a chain of sausages of a length for hanging on one rod, transferring the rod placed in the rod receiving portions in the second group of hook units to the rod receiving portions in the first group of hook units by transferring the first group of hook units and the second group of hook units downstream in the movement direction in a state of preventing movement of the rod held in the rod receiving portions in the second group of hook units, and thereafter rotating the rod portions in the first group of hook units so as to cause the chain of sausages suspended on the hook portions to fall onto the rod.

An apparatus for hanging sausage on a rod according to the present invention enables a task of removing a chain of sausages hung on a rod and closure processing on a front end portion or a rear end portion of a chain of sausages to be performed in parallel with a task of suspending a chain of sausages on hook units. As a result, the need to pause the task of suspending a chain of sausages on hook units is eliminated, thus making it possible to raise the operating rate of the apparatus for hanging sausage on a rod.

Furthermore, increasing the speed of the task of suspending a chain of sausages on hook units makes it possible to shorten the time required for hanging sausage on a rod.

These and other objects, features and advantages of the present invention will become more apparent upon reading of the following detailed description along with the accompanied drawings.

BRIEF DESCRIPTION OF THE DRAWINGS

FIGS. 4A and 4B are front views for describing basic operations of a hook unit.

DETAILED DESCRIPTION OF THE INVENTION

Hereinafter, an apparatus for hanging sausage on a rod according to embodiments of the present invention will be described with reference to the drawings.

Embodiment 1

Figure 1:
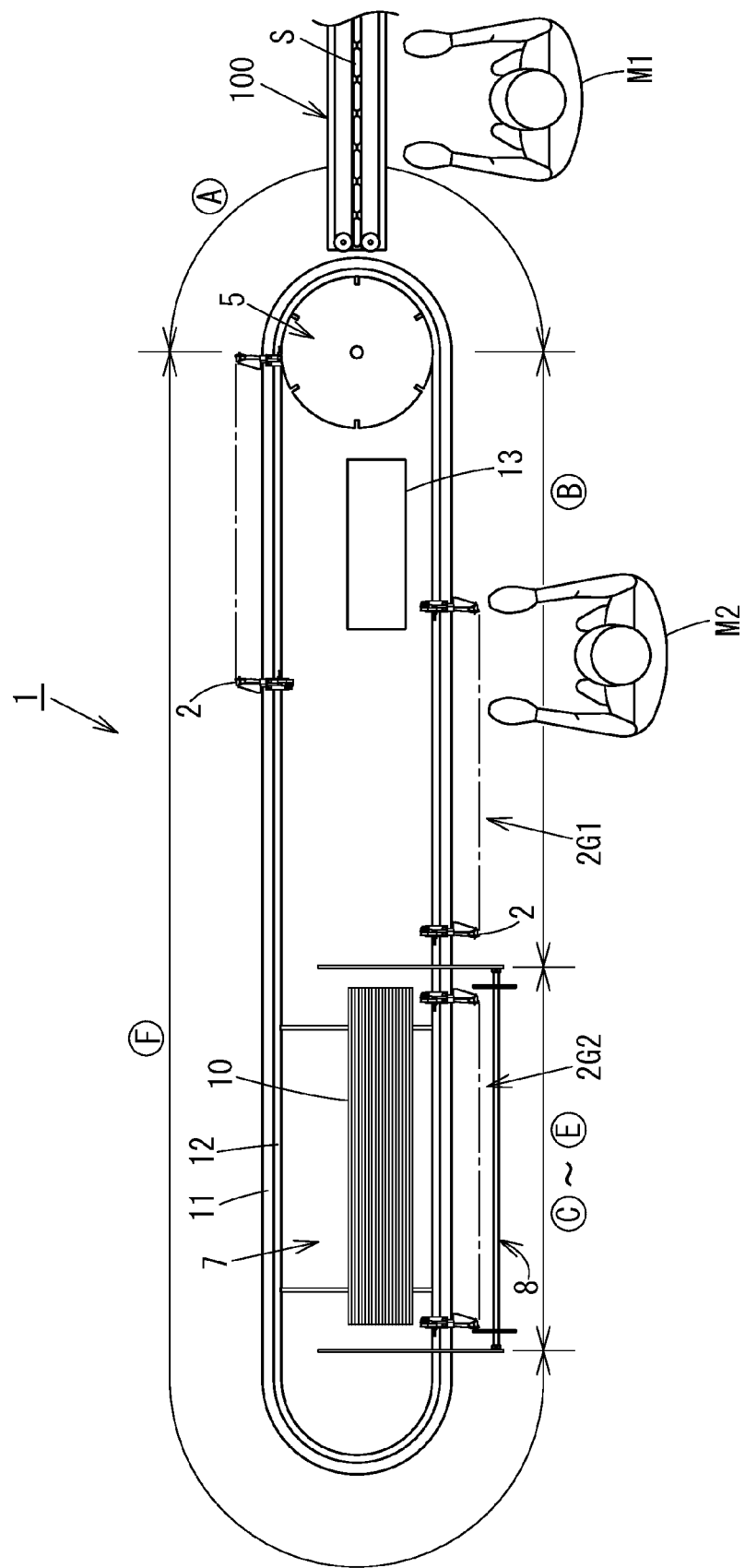
FIG. 1 is a plan view showing an apparatus for hanging sausage on a rod according to Embodiment 1 of the present invention, as viewed from above.

Overview of Configuration of Apparatus for Hanging Sausage on a Rod, Hanging Steps FIG. 1 shows an apparatus for hanging sausage on a rod according to the present embodiment, as viewed from above. Since FIG. 1 is for describing the relationship between hanging steps and the areas in which the steps are executed, the means for executing the steps are not shown. These means will also be described with reference to the drawings in the description of the hanging steps.

An apparatus for hanging sausage on a rod 1 has an endless rail 12 disposed above a table-shaped base 11, and multiple hook units 2 for suspending a chain of sausages, which are arranged on the rail 12. The endless rail 12 is configured by two linear portions and two arc portions. The diameters of the two arc portions do not necessarily need to be the same, and they may be changed according to the functionality required of them.

The hook units 2 themselves are not equipped with a movement means, but rather are transferred individually or in groups along the rail 12 by three types of transfer means that will be described later (a first transfer means 5 shown in FIG. 5, a second transfer means 6 shown in FIG. 6, and a third transfer means 9 shown in FIG. 12). Although several tens of hook units 2 are arranged on the rail 12 in an actual apparatus for hanging sausage on a rod, only the hook units at the two ends of a group of hook units 2 are shown in FIG. 1 in order to avoid complication. The same follows for other drawings as well.

The hanging task with the apparatus for hanging sausage on a rod 1 is divided into the following six steps A to F, and as shown in FIG. 1, the following steps are respectively executed in the areas indicated by reference signs A to F as the hook units 2 make one lap on the endless rail 12 in the clockwise direction when viewing the drawing.

A: suspension of a chain of sausages on hook units

B: transfer of hook units having a chain of sausages suspended thereon

C: removal of a rod from a storage location and transfer to a hanging portion

D: transfer of a chain of sausages from hook units to a rod

E: ejection of a rod with a chain of sausages hung thereon

F: transfer of empty hook units

Hereinafter, the area indicated by reference sign A in FIG. 1 will be referred to as an area A for the sake of convenience in the description. Similarly, the areas indicated by reference signs B, C to E, and F will be referred to as an area B, areas C to E, and an area F respectively.

The following is a simple description of the content of the above-described steps. In step A, the hook units 2 are transferred one-by-one on an arc-shaped portion of the rail 12 using the first transfer means 5, and a chain of sausages S, which is fed from a sausage manufacturing apparatus 100 disposed at a position adjacent to the apparatus for hanging sausage on a rod 1, is suspended on hook portions 22 (see FIG. 2) of the hook units 2.

In step B, a group of hook units whose suspended chain of sausages S has a length that is the length for hanging on one rod (referred to hereinafter as "one rod-worth of hook units 2G" for distinction from individual hook units 2) is transferred by the later-described second transfer means 6 (see FIG. 6) to the areas C to E for performing hanging.

In step C, a rod transfer means 7 is used to remove one rod from the storage location of rods 10 provided between the two linear portions of the rail 12, and then transfer the rod to rod receiving portions 24 (see FIG. 2) provided in the lower portions of the hook units 2.

In step D, the chain of sausages S suspended on the hook portions 22 of the hook units 2 is transferred to the rod 10 held in the rod receiving portions 24.

In step E, the rod 10 that is held in the rod receiving portions 24 of the hook units 2 and has the chain of sausages S hung thereon is ejected to a rod loading table 82 (see FIG. 11) using the rod ejection means 8.

Figure 12:
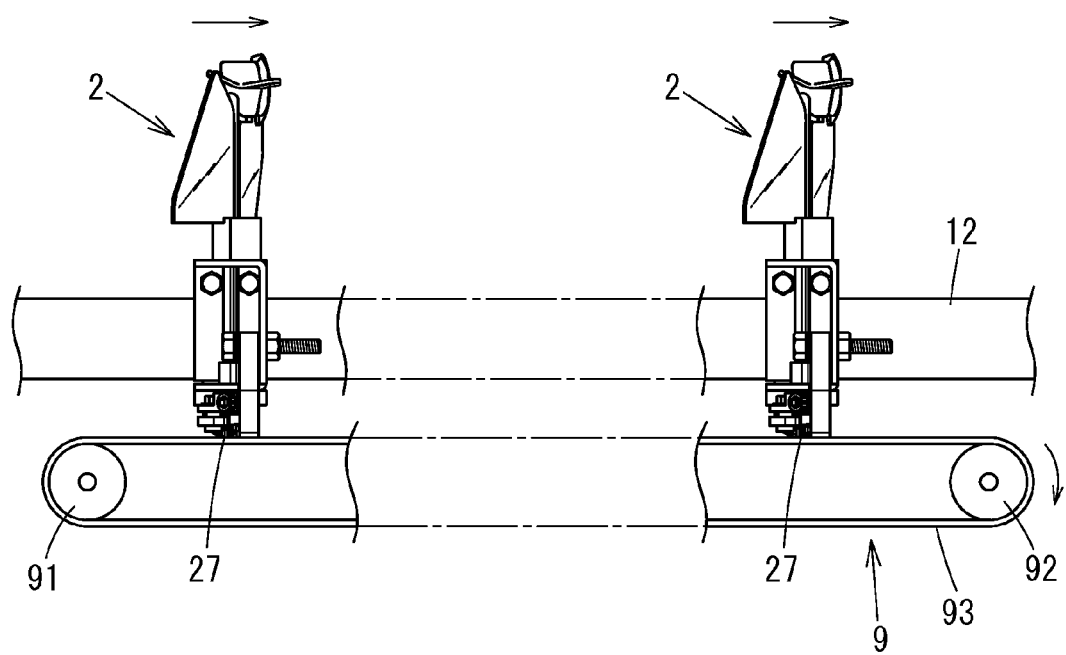
FIG. 12 is a plan view showing a configuration of a third transfer means for the execution of a hanging step F.

In step F, the hook units 2 that are empty due to the rod being removed from the rod receiving portions 24 are transferred to the area A using the third transfer means 9 (see FIG. 12).

Workers M1 and M2 are respectively stationed in the vicinity of the sausage manufacturing apparatus 100 and the apparatus for hanging sausage on a rod 1, and perform tasks that cannot be automated and tasks that unexpectedly need to be performed. Specifically, the worker M1 supplies casings to the sausage manufacturing apparatus 100, which includes a meat filling device, and performs an operation for starting the filling of the chain of sausages S. The worker M2 performs processing for severing and closing joining portions when one rod-worth of the chain of sausages S has been suspended on the hook units 2, and transfers the one rod-worth of hook units 2G with the sausage S suspended thereon using the second transfer means 6 (see FIG. 6), for example.

A sequencer is housed in a control box 13 disposed on the base 11. The driving and stopping of the various transfer means described above is performed by the worker M2 operating switches and buttons provided on the front face of the control box 13. Also, the operating states of the various transfer means are displayed on a display provided on the front face of the control box 13.

Note that although the driving of the various transfer means is performed by motors, gears, actuators, and the like, these motors, gears, actuators, and the like are in principle not shown in the figures in order to avoid complication. Similarly, although cables for power supply and signal transmission are disposed between the control box 13 and the motors and the like for driving the various transfer means, they are also not shown in the drawings.

Configuration and Functions of Hook Units

Figure 2:
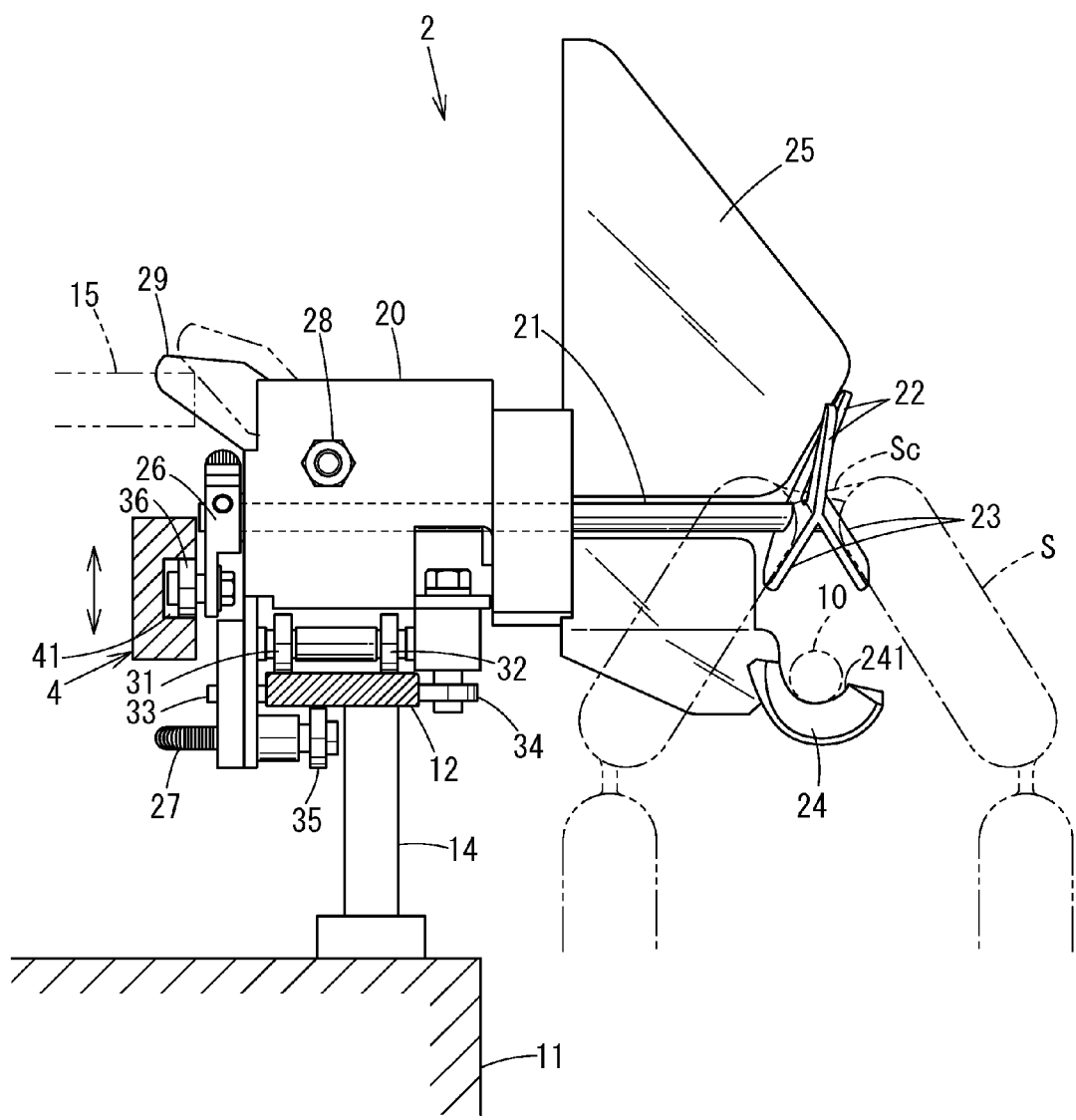
FIG. 2 is a side view of a hook unit disposed on a rail.
Figure 3:
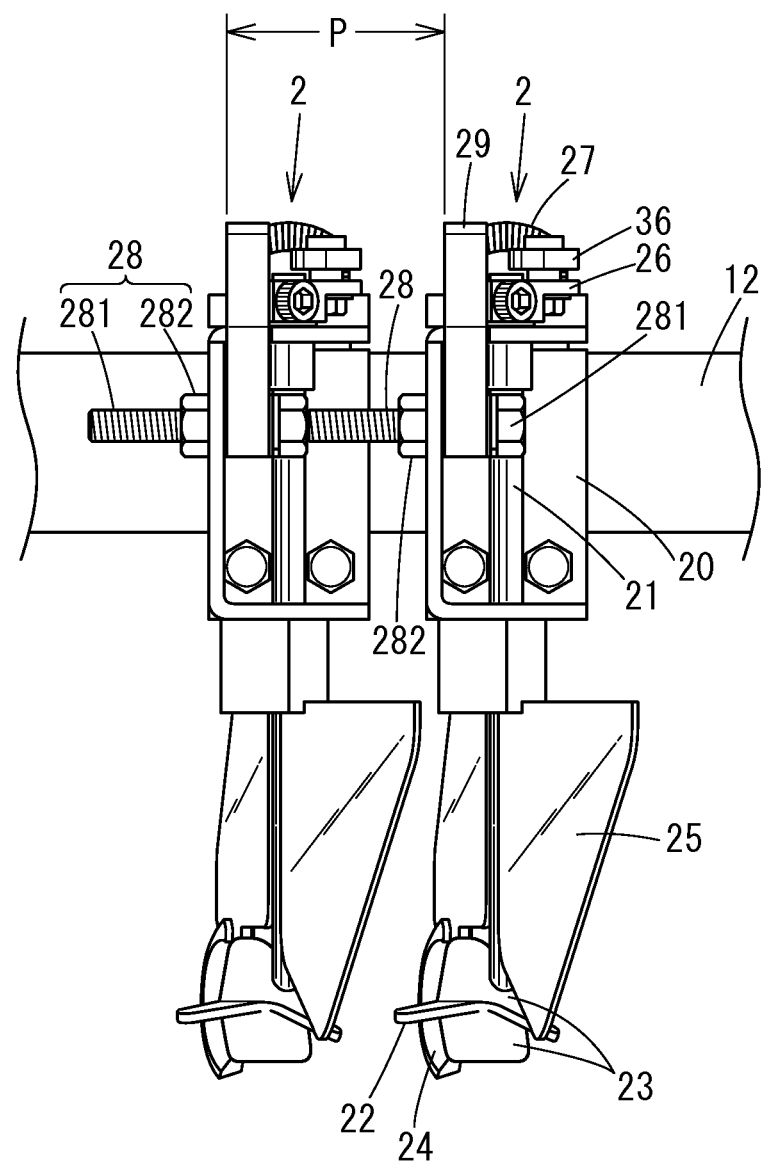
FIG. 3 is a plan view of two hook units disposed on a rail.

The following describes the configuration and functions of the hook units 2 with reference to FIGS. 2 to 4B. FIG. 2 is a diagram showing a hook unit 2 disposed on the rail 12 from the side, FIG. 3 is a diagram showing two hook units 2 disposed on the rail 12 from above, and FIGS. 4A and 4B are diagrams showing a hook unit 2 head on in order to describe basic operations of the hook unit 2.

A feature of the apparatus for hanging sausage on a rod according to the present invention is that the hook units 2 moving along the endless rail 12 can be transferred individually or in groups using multiple transfer means. Employing this configuration enables changing the number of hook units 2 that are transferred and their speed according to the content of the steps, and consequently obtains effects such as those described below.

Firstly, the task of removing and transferring a rod 10, the task of hanging a chain of sausages S on a rod, and the task of ejecting a rod 10 with a chain of sausages S hung thereon can be performed in parallel with the task of suspending a chain of sausages S on the hook units 2. Secondly, a worker can perform closure processing on the front end portion and the rear end portion of a chain of sausages S without pausing the task of suspending a chain of sausages S on the hook units 2. Thirdly, this consequently makes it possible to raise the operating rate of the apparatus for hanging sausage on a rod 1. Furthermore, the speed of the task of suspending a chain of sausages on the hook units 2 can be increased up to the extent that it is still possible to ensure time required for closure processing by a worker, thus making it possible to shorten the time required for hanging.

Next, the configuration and functions of the hook unit 2 will be described. As shown in FIG. 2, the above-described endless rail 12 shown in FIG. 1, is fixed to the base 11 via shafts 14 disposed at a regular interval. The hook units 2 are used for the execution of the hanging steps while moving along the rail 12. Note that rust-resistant stainless steel or antibacterial synthetic resin is used as the material for the portions configuring the hook units 2.

Each hook unit 2 has a unit body 20, a rod 21, a hook portion 22, a support portion 23, a rod receiving portion 24, a guide portion 25, an arm 26, a coil spring 27, an interval holding member 28, and a pivoting member 29.

The unit body 20 is manufactured by bending a stainless steel plate, and five rollers 31 to 35 are attached to the lower portion of the unit body 20 via bearings. The rollers 31 and 32 are used to allow the hook unit 2 to smoothly move over the rail 12. The rollers 33 and 34 are arranged so as to sandwich the rail 12 from the left and right, and are used to restrict the horizontal position of the unit body 20. The roller 35 is used to restrict the vertical position of the unit body 20.

These rollers 31 to 35 enable the hook unit 2 to move smoothly and freely along the rail 12. Among these rollers, the rollers 31, 32, and 35 in particular prevent the unit body 20 from falling off under the weight of a chain of sausages S when the chain of sausages S is suspended on the hook portion 22.

The bar-shaped rod 21 is pivotably attached to the upper portion of the unit body 20. The hook portion 22 and the support portion 23 are attached to the front end portion of the rod 21, and the arm 26 is attached to the rear end portion. The hook portion 22, which is configured by two claws formed in a V shape, is used for suspending a chain of sausages S, and as shown by dashed double-dotted lines in FIG. 2, the chain of sausages S is suspended such that a joining portion Sc is hung on the hook portion 22.

The support portion 23 is formed so as to be integrated with the bottom portion of the hook portion 22, and is configured by two small substantially quadrangular plates arranged in an upside-down V shape. The support portion 23 is used for supporting the chain of sausages S at a constant angle while suspended on the hook portion 22.

The arm 26, which is attached to the rear end portion of the rod 21, extends in a direction orthogonal to the lengthwise direction of the rod 26, and has the roller 36 attached to its tip. An elongated elevating means 4 has a groove 41 that extends parallel with the rail 12, the roller 36 is engaged with the groove 41, and the arm 26 swings along with up and down movement of the elevating means 4. In other words, the arm 26 has a function of converting up and down movement of the elevating means 4 into pivoting movement of the rod 22. The function of the arm 26 will be described in detail later with reference to FIGS. 4A and 4B.

On the front portion of the unit body 20, the guide portion 25, which is formed by a stainless steel flat plate, is attached in a somewhat tilted state at a position above the hook portion 22, and the rod receiving portion 24 is attached at a position below the hook portion 22. The guide portion 25 has a function of guiding a chain of sausages S suspended at the feeding opening of the sausage manufacturing apparatus 100 to the hook portion 22.

The rod receiving portion 24 is for the placement a rod 10 for hanging, and an arc-shaped recessed portion 241 is formed in the upper portion of the rod receiving portion 24 to prevent the rod 10 from falling.

An arc-shaped coil spring 27 is attached to the lower portion of the unit body 20 on the back face side so as to protrude rearward. The coil spring 27 is used for transferring the hook unit 2 when it is empty, and a description of this function will be given when the third transfer means 9 (see FIG. 12) is described.

The interval holding member 28 is provided on a side face of the unit body 20. As shown in FIG. 3, the interval holding member 28 is used to maintain a regular interval P between the hook units 2, and is configured by a bolt 281 and nuts 282. With regards to two hook units 2 moving along the rail 12, the tip of the bolt 281 of the upstream (rightward when viewing the drawing) hook unit 2 comes into contact with the head portion of the bolt 281 of the downstream (leftward when viewing the drawing) hook unit 2, thus maintaining the interval P at a predetermined value. The interval P can be changed by adjusting the positions of the nuts 282 that fix the bolt 281 to the unit body 20.

Although the interval holding member 28 is not limited to having the above-described configuration, configuring the interval holding member 28 using simple parts such as a bolt and nuts enables inexpensively realizing a highly reliable interval holding member.

The pivoting member 29 is provided on the rear portion of the unit body 20. A hole is formed in the lower portion of the pivoting member 29, and the bolt 281 configuring the interval holding member 28 is inserted into that hole. Accordingly, the pivoting member 29 can freely pivot about the bolt 281 in a vertical plane. In the normal state, the pivoting member 29 is kept at the position indicated by the solid line in FIG. 2 due to its own weight. The function of the pivoting member 29 will be described in detail later with reference to the drawings.

Next, operations of the hook portion 22 will be described with reference to FIGS. 4A and 4B. As previously described, the rod 21 pivots due to up and down movement of the roller 36 attached to the rear end of the arm 26 (see FIG. 2). The elevating means 4 is configured so as to be able to move vertically due to a driving means (not shown) that includes a motor, and as shown in FIG. 4A, the V-shaped hook portion 22 is in an upward-opened state when the elevating means 4 is at a low position. In contrast, as shown in FIG. 4B, the hook portion 22 is in a leftward-opened state when the elevating means 4 is at a high position.

In the previously described hanging step D, when a chain of sausages S is suspended on the hook portion 22 of the hook unit 2, the hook portion 22 is in an upward-opened state, and the joining portion Sc of the chain of sausages S is hung thereon as shown in FIG. 4A.

In contrast, when the chain of sausages S is to be transferred to the rod 10 held in the rod receiving portion 24, the hook portion 22 rotates in the direction indicated by the arrow (counter-clockwise) as the elevating means 4 rises, thus entering the leftward-opened state, and the joining portion Sc of the chain of sausages S slides along the inclined face of the hook portion 22 and falls onto the rod 10 as shown in FIG. 4B. In this way, the chain of sausages S is transferred from the hook unit 2 to the rod 10.

Note that the structures of the various portions of the hook unit 2 are not limited to the structures shown in FIGS. 2 to 4B. Other structures may be employed as long as they can realize similar functionality. For example, although the rollers 31 to 35 are attached to the lower portion of the unit body 20 in the present embodiment, as long as the functions of other members are not hindered, a configuration is possible in which the rollers 31 to 35 are attached to the rear face of the unit body 20 so as to enable the hook unit 2 to move on the side face of the rail 12.

Description of Hanging Steps

Next, the hanging steps performed with the apparatus for hanging sausage on a rod 1 will be described with reference to previously-mentioned FIG. 1 as well as FIGS. 5 to 12. Note that in order to avoid complication in FIGS. 5 to 12, as a principle, only members related to the corresponding steps are shown, and other members are not depicted.

First, step A for suspending a chain of sausages S on a hook unit 2 will be described with reference to FIGS. 1 and 5. FIG. 5 shows the configuration of the first transfer means 5 for executing step A. In order to facilitate understanding, the positions of hook units 2 are indicated by P1 to P5 in FIG. 5.

The first transfer means 5 is configured by a disc-shaped rotating table 51 arranged so as to conform to the arc-shaped portion of the rail 12. The rotating table 51 is configured so as to be able to rotate about a shaft 52, and rotates in the direction indicated by the arrow when driven by a motor (not shown). The rotational speed of the rotating table 51 can be adjusted by the control box 13, and is kept in a constant relationship with the feeding speed of the chain of sausages S fed from the sausage manufacturing apparatus 100. Six notch portions 53 are formed at an interval of 60 degrees in the circumferential portion of the rotating table 51, and the tip portions of the pivoting members 29 of the hook units 2 engage with the notch portions 53. Note that the number of notch portions 53 is not limited to six, and the number thereof may be increased as necessary.

A hook unit 2 that is empty when the hanging task ends is transferred by the later-described third transfer means 9 (see FIG. 12) in the rightward direction along the linear portion of the rail 12 on the upper side in FIG. 1, and comes into contact with the rotating table 51. As shown in FIG. 5, a height restriction member 15 is arranged along the rail 12, and as shown by the previously-mentioned dashed double-dotted lines in FIG. 2, the height of the pivoting member 29 is restricted by the height restriction member 15 such that the pivoting member 29 remains above the unit body 20.

Since the height of the upper face of the rotating table 51 is set the same as the height of the upper face of the height restriction member 15, when the hook unit 2 is transferred in the rightward direction (to the position P1), the pivoting member 29 is transferred from the height restriction member 15 to the rotating table 51 while remaining above the unit body 20.

The rotating table 51 rotates in this state, and when a notch portion 53 arrives at a position opposing the pivoting member 29, the pivoting member 29 falls into the notch portion 53 due to its own weight, thus being engaged therewith. When the pivoting member 29 engages with the notch portion 53, the hook unit 2 moves along the rail 12 in synchronization with the rotating table 51 (to the position P2), and is transferred to the position where the chain of sausages S fed from the sausage manufacturing apparatus 100 is suspended (position P3).

Figure 5:
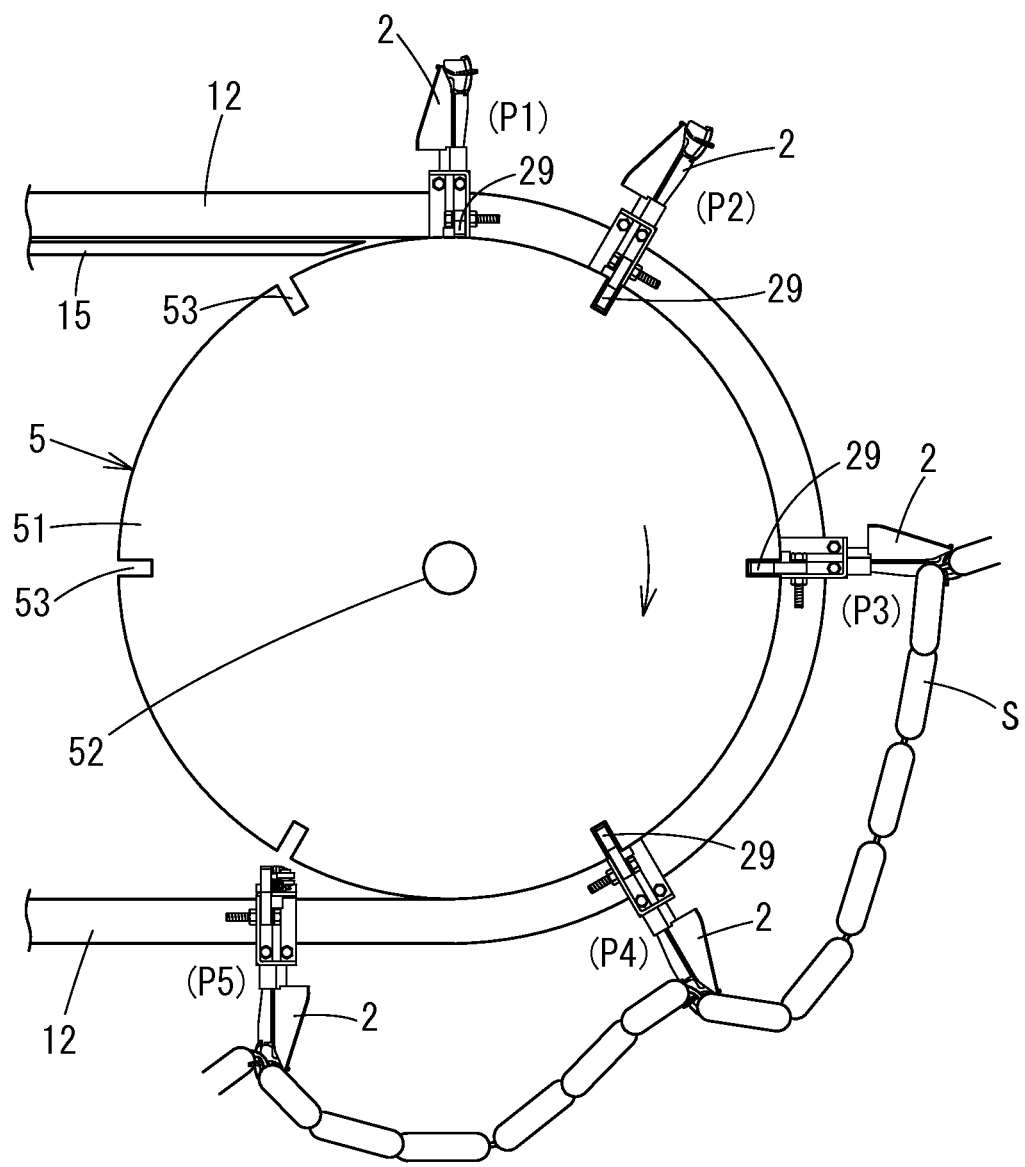
FIG. 5 is a plan view showing a configuration of a first transfer means for the execution of a hanging step A.

If the rotational speed of the rotating table 51 and the feeding speed of the chain of sausages S are adjusted, it is possible for, for example, every seventh joining portion of the chain of sausages S suspended from the feeding opening of the sausage manufacturing apparatus 100 to be hung on the hook portion 22 of a hook unit 2 as shown in FIG. 5. As a result, it is possible to realize a state in which six sausages are suspended between two adjacent hook units 2, as shown by the hook units 2 at the positions P3, P4, and P5.

The hook unit 2 with the chain of sausages S suspended thereon is transferred as the rotating table 51 rotates, and at the position P5 in FIG. 5, the pivoting member 29 separates from the notch portion 53 of the rotating table 51 and stays at that location. However, since the hook units 2 are transferred one after another due to the rotation of the rotating table 51, a downstream hook unit 2 is moved in the leftward direction along the rail 12 due to being pushed by an upstream hook unit 2, thus obtaining a series of hook units 2 on the rail 12.

Next, step B for transferring hook units 2 with sausages suspended thereon will be described with reference to FIGS. 6 and 7. FIG. 6 shows a state in which a chain of sausages S is suspended on a series of hook units 2 on the rail 12. FIG. 7 shows this state as viewed from the side.

Figure 6:
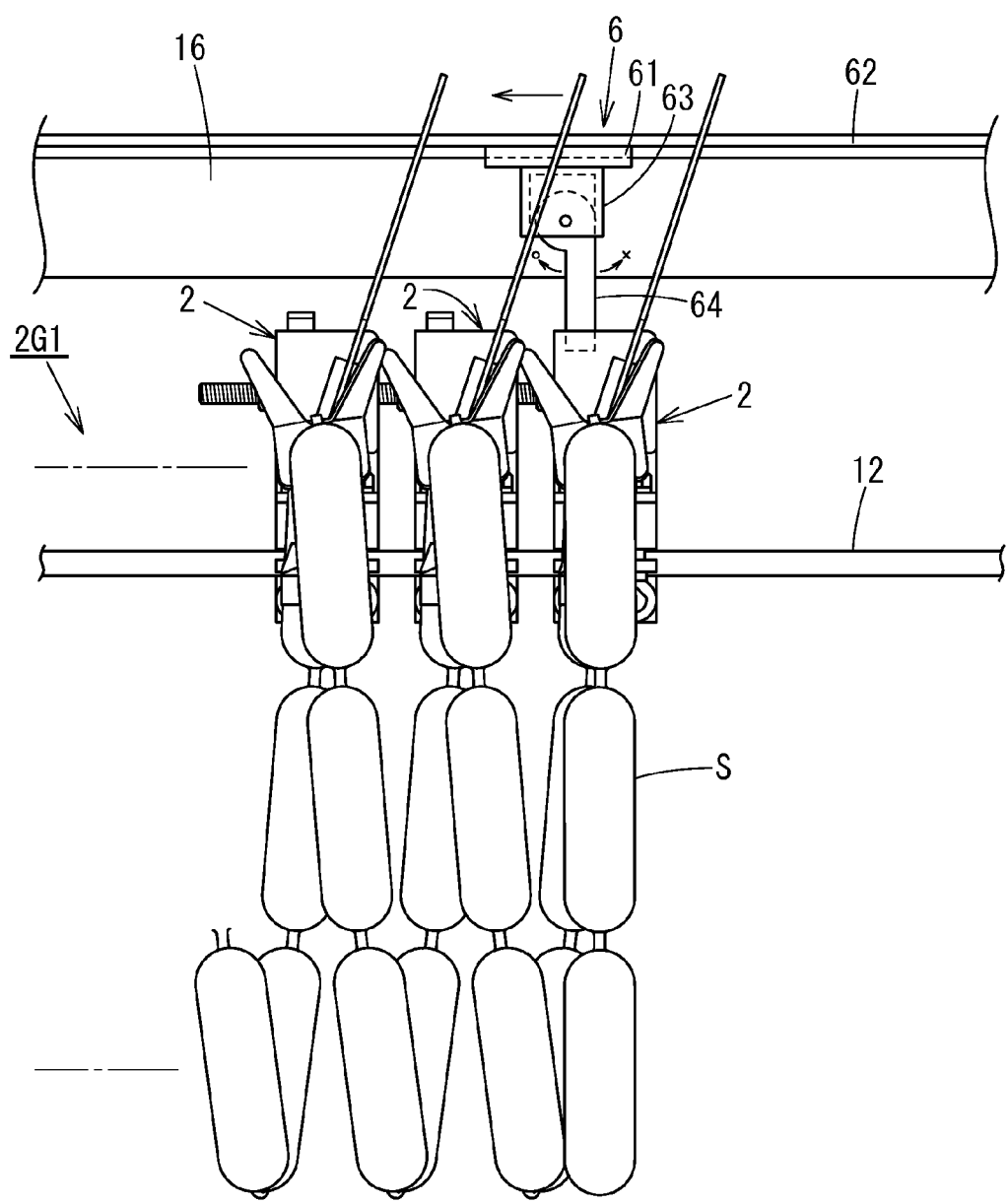
FIG. 6 is a front view showing a configuration of a second transfer means for the execution of a hanging step B.
Figure 7:
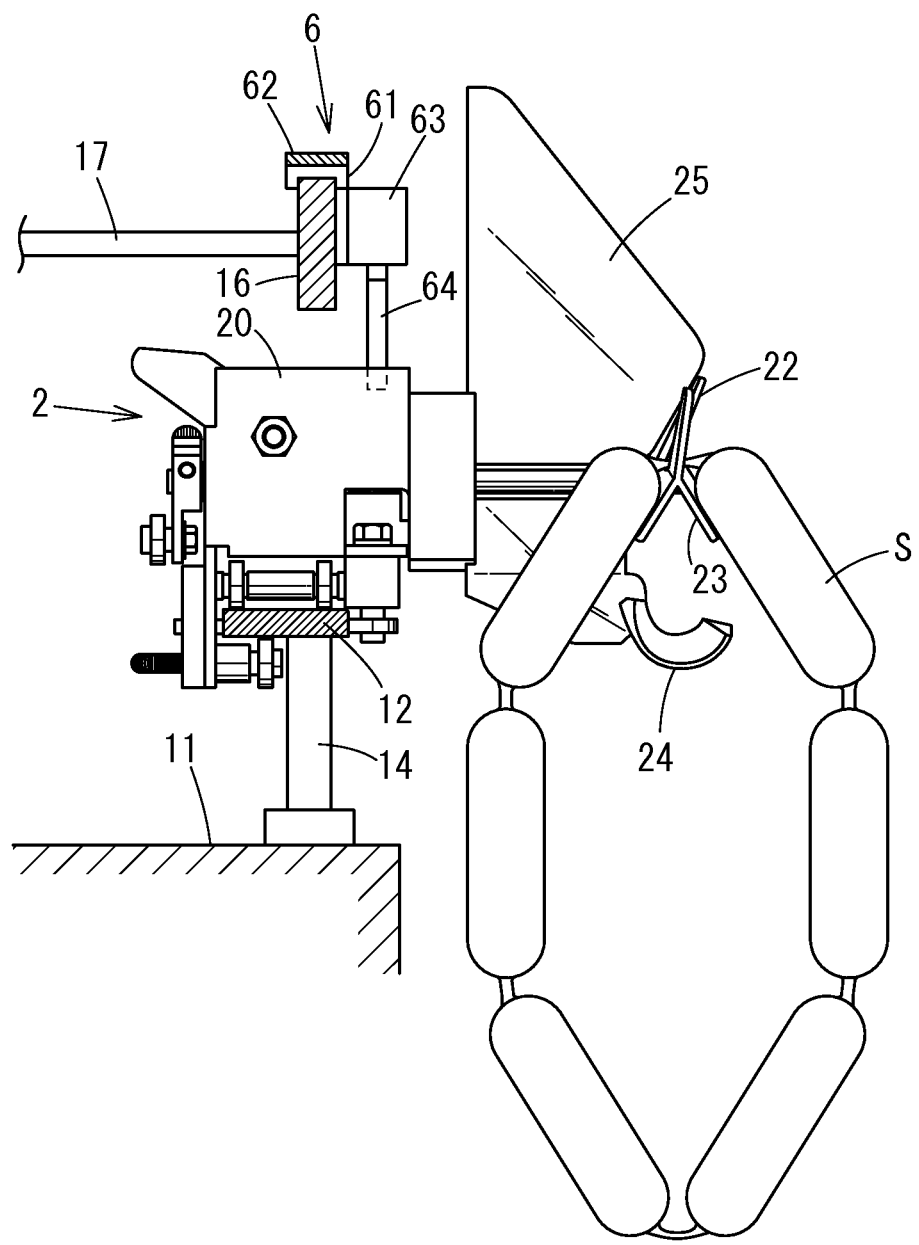
FIG. 7 is a side view showing a configuration of the second transfer means for the execution of the hanging step B.

As shown in FIG. 6, six sausages are regularly suspended between adjacent hook units 2. As shown in FIG. 7, each group of six suspended sausages spreads to the left and right due to the support portion 23 so as to form a loop, and a space sufficiently wide for the insertion of a rod 10 is formed between the suspended sausages.

As described above, when step A ends, a row of hook units 2 with a chain of sausages S suspended thereon is formed on the rail 12. The worker M2 then operates the second transfer means 6 so as to transfer one rod-worth of hook units 2 (hereinafter, one rod-worth is considered to be 20 hook units 2) at a time from the series of hook units 2 to the areas C to E in which step D is executed.

The second transfer means 6 is configured by a slider 61, a belt 62, a ratchet 63, and an arm 64. The slider 61 is shaped so as to span across a rail 16 disposed on the base 11 via a shaft 17, and when the belt 62 attached to the upper portion is moved by a motor (not shown), the slider 61 moves to the left or right along the rail 12.

The ratchet 63 is attached to the lower portion of the slider 61. The arm 64, which is rotatable, is attached to the ratchet 63, and the tip portion of the arm 64 reaches the unit body 20 of the hook units 2. As shown by arrows in FIG. 6, the arm 64 is structured such that due to its shape, it can rotate in one direction (clockwise) indicated by a circle in the figure, and cannot rotate in the opposite direction (counter-clockwise) indicated by a cross in the figure.

Accordingly, as shown in FIG. 6, when the slider 61 is moved by the belt 62 in the leftward direction indicated by an arrow, the tip of the arm 64 presses against a unit body 20 so as to move the hook units 2 leftward. In contrast, when the slider 61 moves in the rightward direction, the tip of the arm 64 comes into contact with a unit body 20 and rotates so as to move away from the unit body 20. Accordingly, the hook unit 2 stays at its location instead of being moved.

Under control of the control box 13, the slider 61 of the second transfer means 6 is set such that when the transfer of the one rod-worth of hook units 2G1 ends, the slider 61 moves in the rightward direction and always stops at the same position.

Figure 9A:
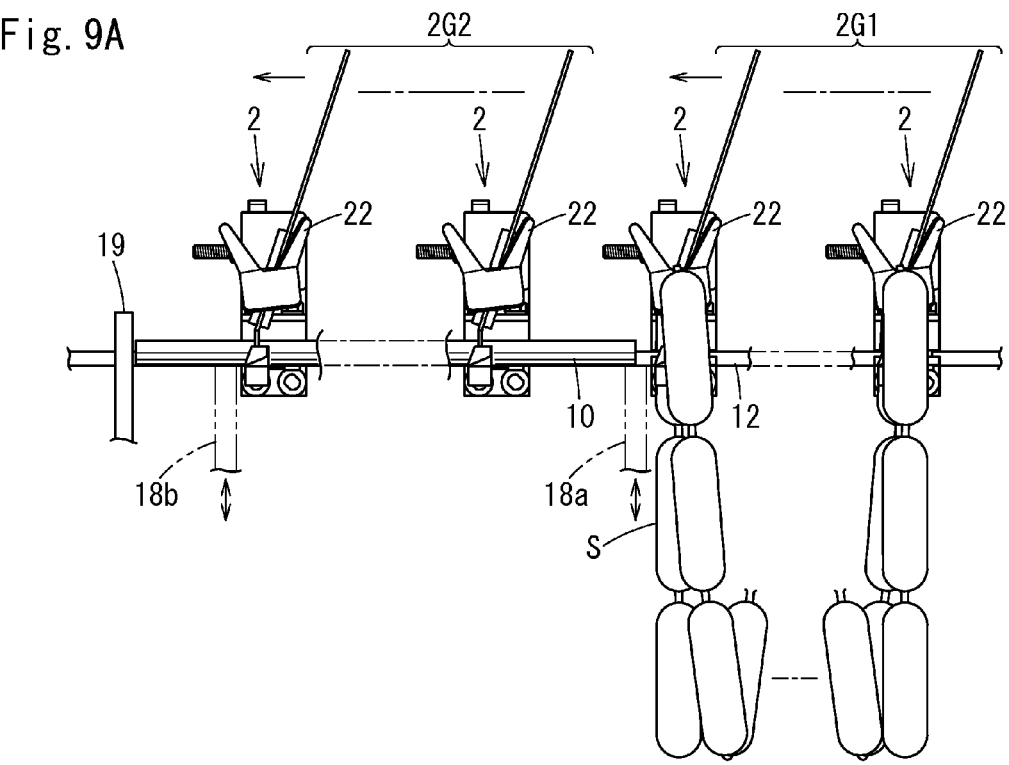
FIGS. 9A and 9B are front views for describing operations in the first half of a hanging step D.
Figure 9B:
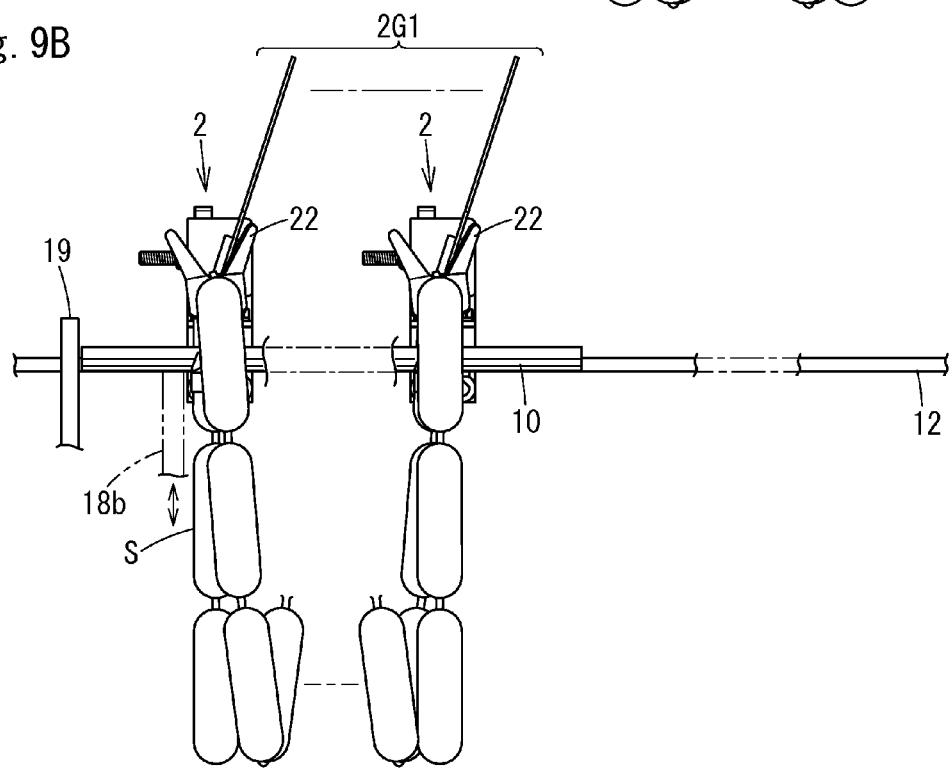

The position at which the slider 61 stops is rightward of the trailing hook unit 2 when one rod-worth of (20) hook units 2 are aligned in a series between a stopper 18a and the slider 61 shown in FIG. 9. When the worker M2 presses a button of the control box 13 so as to operate the second transfer means 6 in this state, the stopper 18a descends so as to be released from the stopped state, and the one rod-worth of hook units 2G1 is transferred to the areas C to E where hanging step D is performed (see FIG. 1). Note that the function of the stoppers 18 will be described in detail later with reference to FIGS. 9A and 9B.

Since the movement direction, movement speed, and movement distance of the second transfer means 6 can be adjusted using the buttons and switches of the control box 13, they can be set independently of the rotational speed of the rotating table 51 in step A.

If the length of the chain of sausages S suspended on hook units 2 exceeds one rod-worth, the worker M2 needs to adjust the length of the chain of sausages S by severing a joining portion Sc before the group of hook units 2 is sent to the areas C to E. In such a case, the severing of the joining portion Sc and closure processing need to be performed while the hook units 2 are motionless, and since hook units 2 with sausages S suspended thereon continue to be transferred along the rail 12 as the rotating table 51 rotates, the hook units 2 accumulate on the rail 12.

However, since the speed at which one rod-worth of hook units 2G1 is transferred to the areas C to E using the second transfer means 6 can be set much faster than the rotational speed of the rotating table 51, the task delay caused by the severing of the joining portion Sc and closure processing can be sufficiently absorbed.

Note that the configuration of the second transfer means 6 is not limited to the configuration shown in FIGS. 6 and 7. Another means such as a linear motor may be used as the means for moving the slider 61. Also, a clutch may be used as a means for exerting force in only one rotational direction.

Figure 8:
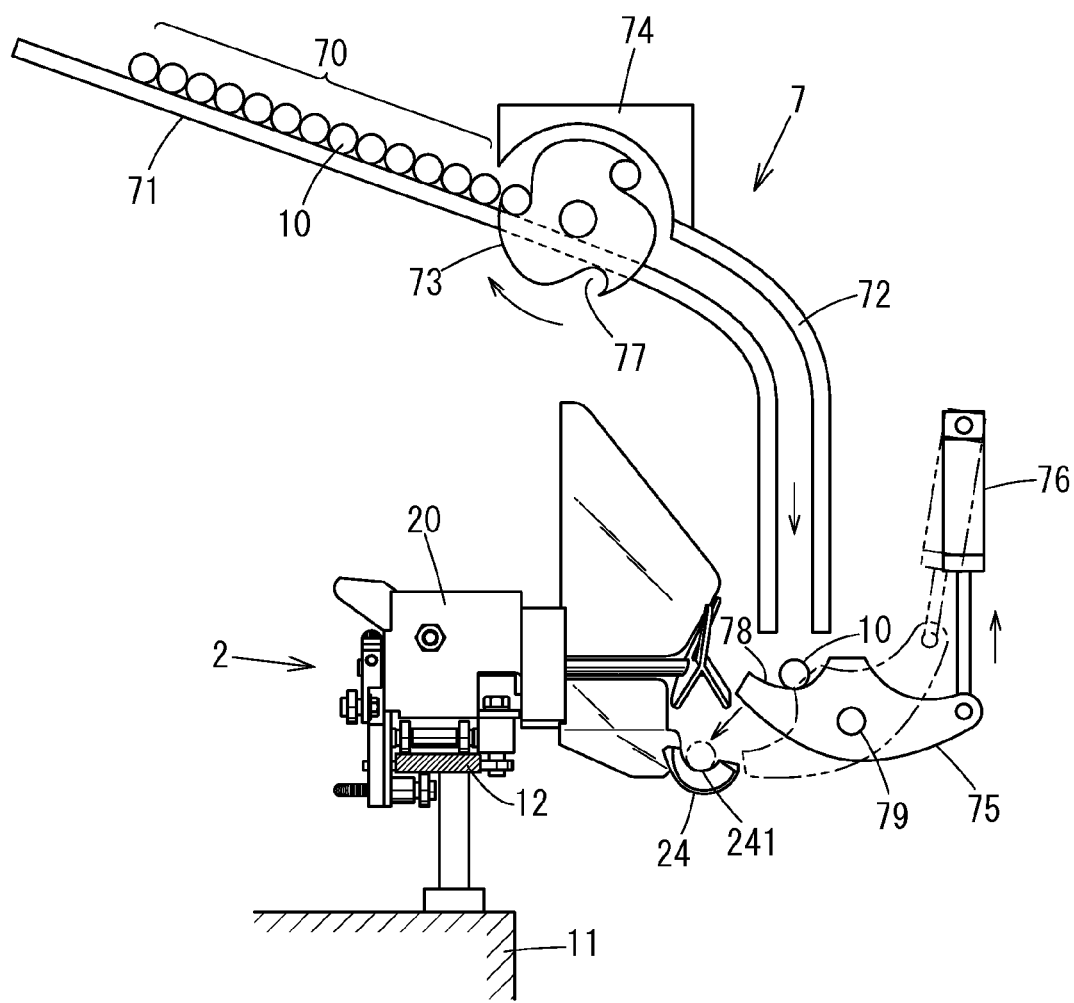
FIG. 8 is a side view showing a configuration of a rod transfer means for the execution of a hanging step C.

Next, step C for removing a rod 10 from the storage location and placing it in the rod receiving portion 24 of a hook unit 2 will be described with reference to FIGS. 1 and 8. FIG. 8 shows an overview of the configuration of the rod transfer means 7 for transferring a rod 10 to the rod receiving portion 24 of a hook unit 2.

As shown in FIG. 8, the rod transfer means 7 is arranged so as to span across the rail 12 in the areas C to E where hanging step D is performed. When a rod 10 is transferred to the rod receiving portions 24 of hook units 2, the one rod-worth of (20) hook units 2G2 that remain are hook units for which the task of hanging a chain of sausages S on a rod on the rail 12 under the rod transfer means 7 is complete, and the rod 10 has been removed from the rod receiving portions 24, as shown in FIG. 1.

The rod transfer means 7 is configured by rod guide members 71 and 72, a rod separation member 73, a fly-off prevention member 74, a rod transfer member 75, and a cylinder 76. Among these members, the rod guide members 71 and 72, the rod separation member 73, the fly-off prevention member 74, the rod transfer member 75, and the cylinder 76 are each arranged in pairs along the rail 12 in the vicinity of the two ends of the rods 10.

The rod guide members 71 and 72 are obtained by bending a stainless steel bar. The upper portion of the rod guide member 71 also serves as a storage location 70 for the rods 10, which stores multiple rods 10 and also plays the role of a guide when one retrieved rod 10 is transferred to the rod transfer member 75. The rod separation member 73, which is arranged at an intermediate point along the rod guide member 71, is for separating and retrieving one rod 10 from the storage location 70 for rods 10, and thus is a circular plate whose outer circumferential portion has three grooves 77 formed so as to accommodate rods 10.

When the rod separation member 73 is rotated in the direction of the arrow by a motor (not shown), the lowest rod among the rods 10 stored in the storage location 70 enters one of the grooves 77 of the rod separation member 73, moves rightward as the rod separation member 73 rotates, falls out of the groove 77 due to its own weight, and is then guided by the fly-off prevention member 74 and the pair of rod guide members 71 and 72 so as to fall into a recessed portion 78 of the rod transfer member 75.

One end of the rod transfer member 75 is coupled to the cylinder 76, and when the cylinder 76 retracts, the rod transfer member 75 rotates counter-clockwise about a shaft 79 as shown by dashed double-dotted lines in FIG. 8. According to this, the rod 10 placed in the recessed portion 78 of the rod transfer member 75 falls into the rod receiving portion 24 attached to the lower portion of the hook unit 2, and is held in the recessed portion 241. When the rod 10 is placed in the rod receiving portion 24, preparation for step D ends.

Note that the configuration of the rod transfer means 7 is not limited to the configuration shown in FIG. 8. Other configurations may be employed as long as they can realize similar functionality. For example, although the rods are separated using a circular plate with grooves formed therein in FIG. 8, the rods may be separated using two shutters disposed in neighboring locations.

Figure 10A:
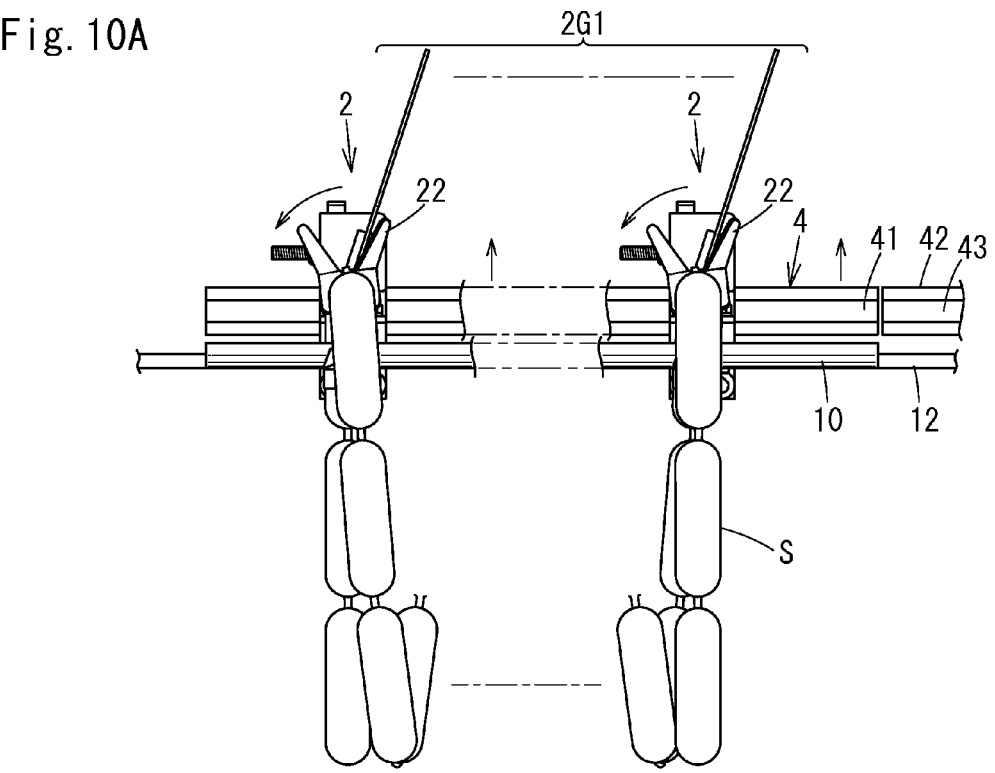
FIGS. 10A and 10B are front views for describing operations in the last half of the hanging step D.
Figure 10B:
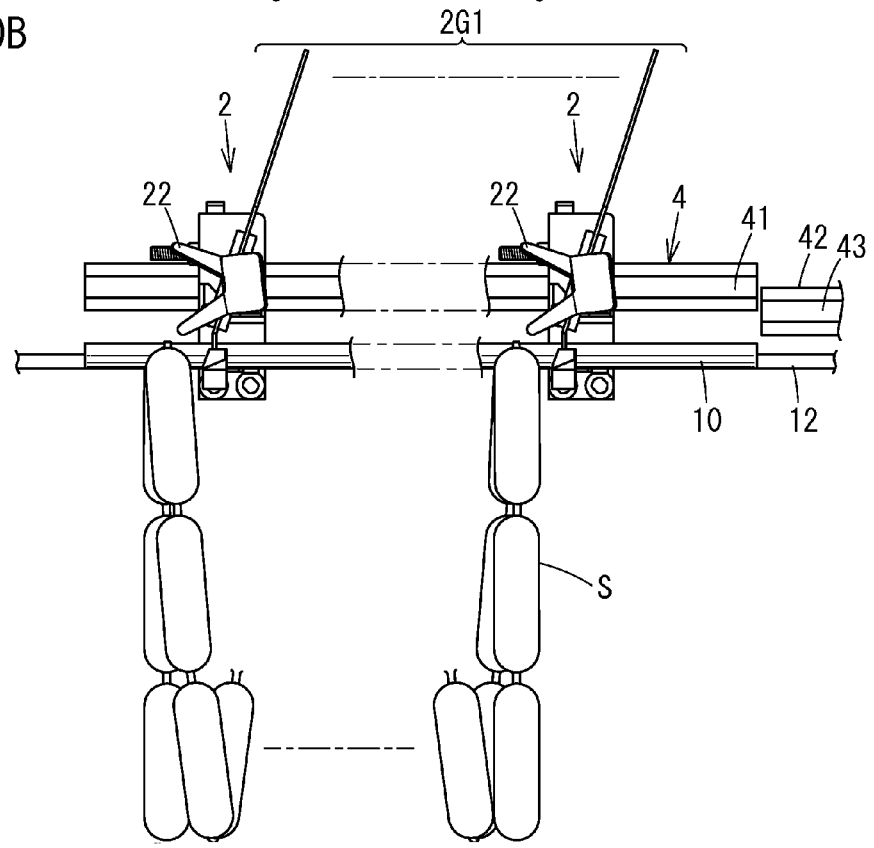

The following describes step D in which a chain of sausages S suspended on hook units 2 is transferred to a rod 10 placed in rod receiving portions 24, with reference to FIGS. 9A to 10B. FIGS. 9A and 9B show operations in the first half of step D, and FIGS. 10A and 10B show operations in the last half of step D.

Step D is for realizing the method of hanging sausage on a rod according to the present invention, and the method employed for inserting a rod into the loops of sausage is a novel method that has not been employed in conventional apparatuses for hanging sausage on a rod.

In a conventional apparatus for hanging sausage on a rod, dedicated mechanisms for supporting rods are provided separately from the hook units, and a chain of sausages suspended on the hook units is transferred to a rod supported by those mechanisms (see Patent Document 1). Alternatively, a rod supported at one end is inserted into the loops of looped sausage suspended on the hook units, and then the sausage is transferred from the hook units to the rod (see FIG. 9 of JP H8-38032A, which is referred to hereinafter as "Patent Document 2").

However, with the method disclosed in Patent Document 1, the structure of the apparatus for hanging sausage on a rod is complicated, and the apparatus is expensive. On the other hand, with the method disclosed in Patent Document 2, although a dedicated mechanism is not necessary, a rod supported at one end is inserted into the loops of looped sausage, and therefore there are cases where sometimes the rod cannot be inserted into the loops due to swinging of its tip.

In contrast, with the method of hanging sausage on a rod of the present invention, a rod is temporarily placed in the rod receiving portions of one rod-worth of hook units that are empty after the completion of hanging, and then that rod is transferred to the rod receiving portions of one rod-worth of hook units that have a chain of sausages suspended on the hook portions. Accordingly, with the method of hanging sausage on a rod of the present invention, there is no need for a dedicated mechanism as in the method of hanging sausage on a rod in Patent Document 1, and there is no swinging of the tip of the rod as in the method of hanging sausage on a rod in Patent Document 2, and therefore the rod can be reliably inserted into loops. The following is a specific description of a method of hanging sausage on a rod of the present invention.

As shown in FIG. 9A, a stopper 18a is disposed on the base 11 at the left end of one rod-worth of hook units 2G1 positioned in the area B shown in FIG. 1. The stopper 18a moves a bar-shaped member up and down with an actuator as shown by the arrows. When the stopper 18a is at the upper position as shown by dashed double-dotted lines in FIG. 9A, the stopper 18a comes into contact with the unit body 20 of a hook unit 2 so as to prevent movement of the hook unit 2 in the leftward direction. It is preferable that the stopper 18a is manufactured from a deformable material such as a coil spring in order to be able to absorb impact upon collision with a hook unit 2.

After the one rod-worth of (20) hook units 2G1 have been transferred to the areas C to E by the second transfer means 6, the stopper 18a rises. When the worker M2 manually moves the hook units 2 fed from the rotating table 51 in the leftward direction, the hook unit 2 at the head of the group stops upon coming into contact with the stopper, and the hook units 2 with a chain of sausages S suspended thereon are arranged in a line on the upstream side with the predetermined interval P.

As shown in FIG. 9A, before hanging step D is performed, one rod-worth of (20) hook units 2G2 having a rod 10 placed in the rod receiving portions 24 through above-described step C is arranged on the left side of the rail 12 (areas C to E). One rod-worth of (20) hook units 2G1 having a chain of sausages S suspended on the hook portions 22 is arranged on the right side of the rail 12 (area B).

A second transfer means 6 and a stopper having configurations similar to those in the area B are disposed in the areas C to E as well. Hereinafter, the second transfer means and the stopper disposed in the area B are referred to as the "transfer means 6a" and the "stopper 18a", and the second transfer means and the stopper disposed in the areas C to E are referred to as the "transfer means 6b" and the "stopper 18b".

Since the sliders 61 of the transfer means 6a and 6b are attached to the same belt 62 in common, the transfer of the one rod-worth of hook units 2G1 by the transfer means 6a is performed in synchronization with the transfer of the one rod-worth of hook units 2G2 by the transfer means 6b. Since the stoppers 18a and 18b are at the lower position when the transfer starts, the movement of the hook units is not hindered.

In the state shown in FIG. 9A, when the worker M2 operates the control box 13, the one rod-worth of hook units 2G1 in the area B is transferred in the leftward direction by the transfer means 6a, and the one rod-worth of hook units 2G2 in the areas C to E is transferred in the leftward direction by the transfer means 6b, and therefore as shown in FIG. 9B, the one rod-worth of hook units 2G2 on the left side is replaced with the one rod-worth of hook units 2G1 that have a chain of sausages S suspended on the hook portions 22.

When the one rod-worth of (20) hook units 2G2 on the left side have passed the stopper 18b, the stopper 18b rises, the hook unit 2 at the head of the one rod-worth of hook units 2G1 coming from the upstream side stops due to coming into contact with the stopper 18b, and thus the one rod-worth of hook units 2G1 stay at the location indicated by 2G2 in FIG. 1.

At this time, the rod 10 placed in the rod receiving portions 24 stays at its location due to movement in the leftward direction being limited by a plate 19 disposed on the base 11, and thus the rod 10 is transferred to the rod receiving portions 24 of the one rod-worth of hook units 2G1 having the chain of sausages S suspended on the hook portions 22, which is the state shown in FIG. 9B.

Similarly to FIG. 9B, FIG. 10A shows the one rod-worth of (20) hook units 2G1 having a chain of sausages S suspended on the hook portions 22 and a rod 10 placed in the rod receiving portions 24. In this state, the elevating means 4 arranged rearward of the rail 12 is at a low position, and therefore the hook portions 22 are in the upward-opened state, and the chain of sausages S is kept suspended on the hook portions 22.

Thereafter, when the elevating means 4 moves upward due to a driving means (not shown) as shown in FIG. 10B, the hook portions 22 rotate counter-clockwise, the sausage S that was hung on the hook portions 22 falls due to its own weight so as to be transferred to the rod 10 placed in the rod receiving portions 24. In this way, the task of hanging the chain of sausages S on a rod in step D ends. Thereafter, the elevating means 4 descends so as to return to the state shown in FIG. 10A in order to prepare for the transfer of the next one rod-worth of hook units 2G1.

Note that a guide member 42 is provided upstream and downstream of the areas C to E in which step D is executed (see FIGS. 10A and 10B, but the downstream guide member is not shown), and each guide member 42, which has a structure similar to that of the elevating means 4, has a groove 43 that restricts the position of the rollers 36 (see FIG. 2) provided at the tips of the arms 26 of the hook units 2. However, unlike the elevating means 4, the guide member 42 does not move up and down, but rather is held so as to keep a constant height. Rotation of the rods 21 is restricted by the guide member 42, and therefore the rotation angle of the hook portions 22 is maintained even when the hook units 2 move.

Figure 11A:
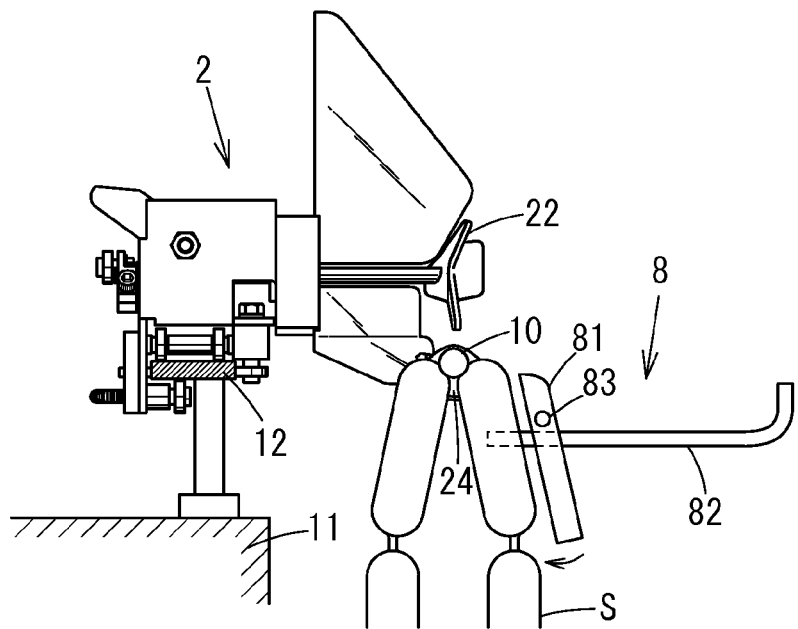
FIGS. 11A and 11B are side views showing a configuration of a rod ejection means for the execution of a hanging step E.
Figure 11B:
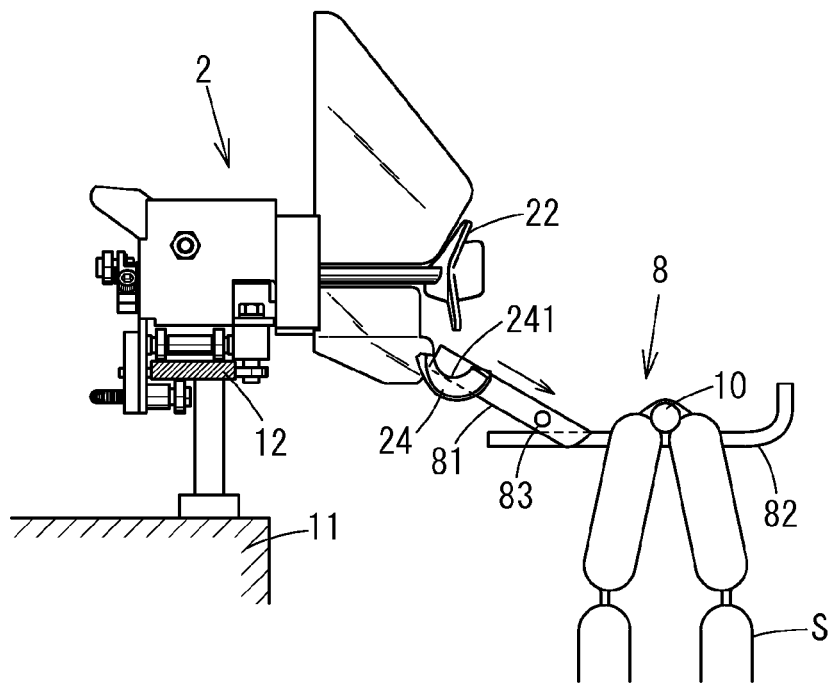

The following describes step E for ejecting a rod 10 for which the task of hanging a chain of sausages S on a rod has ended, with reference to FIGS. 11A and 11B. FIGS. 11A and 11B show an overview of the configuration of the rod ejection means 8 by which a rod 10 for which the task of hanging a chain of sausages S on a rod has ended is ejected onto a rod loading table.

The rod ejection means 8 is configured by a rotating arm 81 and the rod loading table 82, and the rotating arm 81 and the rod loading table 82 are arranged along the rail 12 in the vicinity of the ends of the rod 10.

The rotating arms 81 are each configured so as to be swivel about a shaft 83 due to a motor (not shown). As shown in FIG. 11A, the rotating arm 81 is normally held at a position and angle at which it does not hinder the transfer of a chain of sausages S.

After the transfer of a chain of sausages S from hook units 2 to a rod 10 ends in the previously-described step D, the rotating arms 81 swivel in the direction indicated by the arrow (clockwise), thus coming into contact with and pushing up the rod 10 placed in the rod receiving portions 24, and pushing the rod 10 out of the recessed portions 241 of the rod receiving portions 24.

As shown in FIG. 11B, the rod 10 that was pressed out from the recessed portions 241 of the rod receiving portions 24 moves downward while sliding over the rotating arms 81, and becomes placed on the rod loading table 83. The rod 10 placed on the rod loading table 83 is retrieved by the worker M2 or a dedicated transport apparatus, and then transferred to a carriage for smoking.

Note that the configuration of the rod ejection means 8 is not limited to the configuration shown in FIGS. 11A and 11B. Another configuration may be employed as long as it can realize functionality similar to that of the configuration shown in FIGS. 11A and 11B.

The following describes step F in which hook units 2 that are empty when the hanging task ends are transferred to the location where step A is performed, with reference to FIGS. 1 and 12. FIG. 12 shows an overview of the configuration of the third transfer means 9 for transferring empty hook units 2.

The third transfer means 9 is disposed on the base 11, which is surrounded by the rail 12, at a location in the vicinity of the linear portion of the rail 12 on the upper side shown in FIG. 1. As shown in FIG. 12, the third transfer means 9 is configured by a pair of timing pulleys 91 and 92 that are disposed along the rail 12, and a belt 93 that is wound around the timing pulleys 91 and 92.

The belt 93 is arranged so as to come into contact with the half circle-shaped coil springs 27 attached to the lower portions of the hook units 2 on the back face side. The hook units 2 that are empty when the hanging task ends as described above are transferred by the second transfer means 6 disposed in the areas C to E, so as to move clockwise around the arc portion of the rail 12 on the left side in FIG. 1 and then move in the rightward direction along the linear portion of the rail 12 on the upper side.

The timing pulleys 91 and 92 are constantly rotated by a motor (not shown). As shown in FIG. 12, when the hook units 2 move along the rail 12 in the rightward direction, the coil springs 27 come into contact with the belt 93. The hook units 2 are then transferred in the rightward direction by frictional force between the coil springs 27 and the belt 93, and then temporarily stop when the coil springs 27 separate from the belt 93, but then move in the rightward direction due to being pushed by hook units 2 that continue to be transferred by the third transfer means 9. When the hook units 2 arrive at a position of coming into contact with the rotating table 51 (see FIG. 5), the task of step A described above is started again.

As shown in FIG. 12, in the present embodiment, the arc-shaped coil springs 27 are attached to the lower portion of the back face of the hook units 2, and the hook units 2 are transferred by bringing the coil springs 27 into contact with the belt 93. Even if the distance between the belt 93 and the arc-shaped coil springs 27 varies, the variation in the distance between the belt 93 and the coil springs 27 can be absorbed by deformation of the coil springs 27, thus realizing stable transfer.

Embodiment 2

Figure 13:
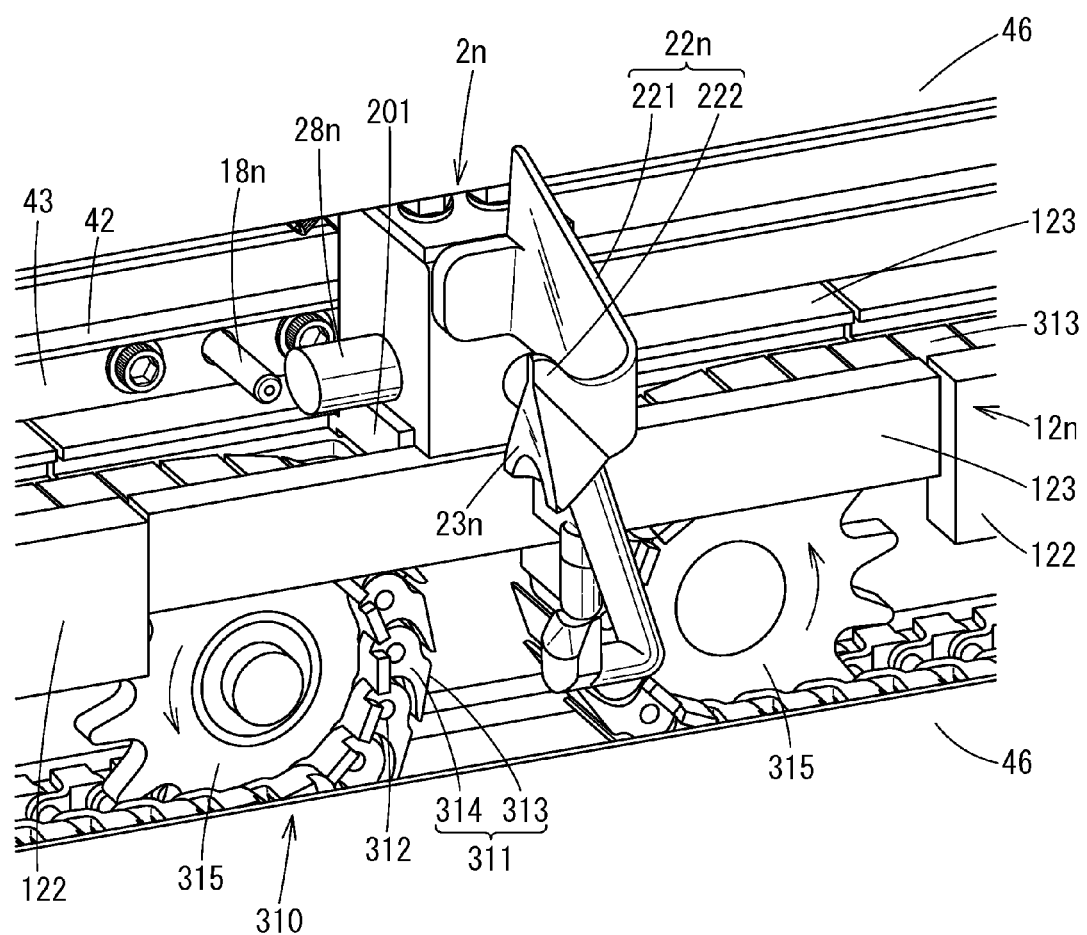
FIG. 13 is a perspective view showing how hook units are transferred in an apparatus for hanging sausage on a rod according to Embodiment 2 of the present invention, as viewed from obliquely ahead.

FIG. 13 is a diagram showing how a hook unit 2n used in the present embodiment is transferred on the downstream side of the area B in FIG. 1, as viewed from obliquely ahead. Also, FIG. 14, which corresponds to FIG. 2 in Embodiment 1, is a diagram showing how the same hook unit 2n is transferred by a conveyor chain 310, which is a transfer means, as viewed from a side face. FIG. 15, which corresponds to FIG. 3 in Embodiment 1, is a diagram of the same hook unit 2n as viewed from above. FIG. 16, which corresponds to FIG. 4 in Embodiment 1, is a diagram of the same hook unit 2n as viewed from ahead.

An apparatus for hanging sausage on a rod according to the present embodiment is the same as the apparatus for hanging sausage on a rod of Embodiment 1 in terms of the hanging operations performed in the six steps A to F, but is different in the following respects.

(1) A conveyor chain is used as the hook unit transferring means.

(2) The configuration of the hook unit is modified.

These modifications will be described below with reference to the drawings. In the drawings, "n" is appended to the reference signs of members obtained by modifying the shape or the like of constituent members of the apparatus for hanging sausage on a rod, and new reference signs are given to additional constituent members for distinction.

Configuration and Functions of Conveyor Chain

In Embodiment 1, the hook units 2 disposed on the rail 12 are transferred using the first to third transfer means 5, 6, and 9. In contrast, in the present embodiment, the conveyor chain 310 is used as the means for transferring the hook unit 2n, and the hook unit 2n is transferred in the state of being placed on the conveyor chain 310.

Accordingly, in the present embodiment, an interval adjustment means 320 is added to a first transfer means 5n (see FIG. 17), the second transfer means 6 is used as an auxiliary transfer means, and the third transfer means 9 is omitted. Note that the interval adjustment means 320 will be described when describing the first transfer means 5n.

As shown in FIG. 13, the conveyor chain 310 is obtained by joining a large number of links 311, which are made of synthetic resin, using joining pins 312. The links 311 are integrally formed from a top plate 313 for article placement and a link portion 314 for joining, using synthetic resin.

The teeth of a sprocket 315 rotatably attached to the base 11 (not shown) are meshed with the joining pins 312 of the conveyor chain 310, and the conveyor chain 310 moves over a synthetic resin rail 12n (see FIG. 14) due to rotating the sprocket 315 in the arrow direction using a motor (not shown).

Figure 14:
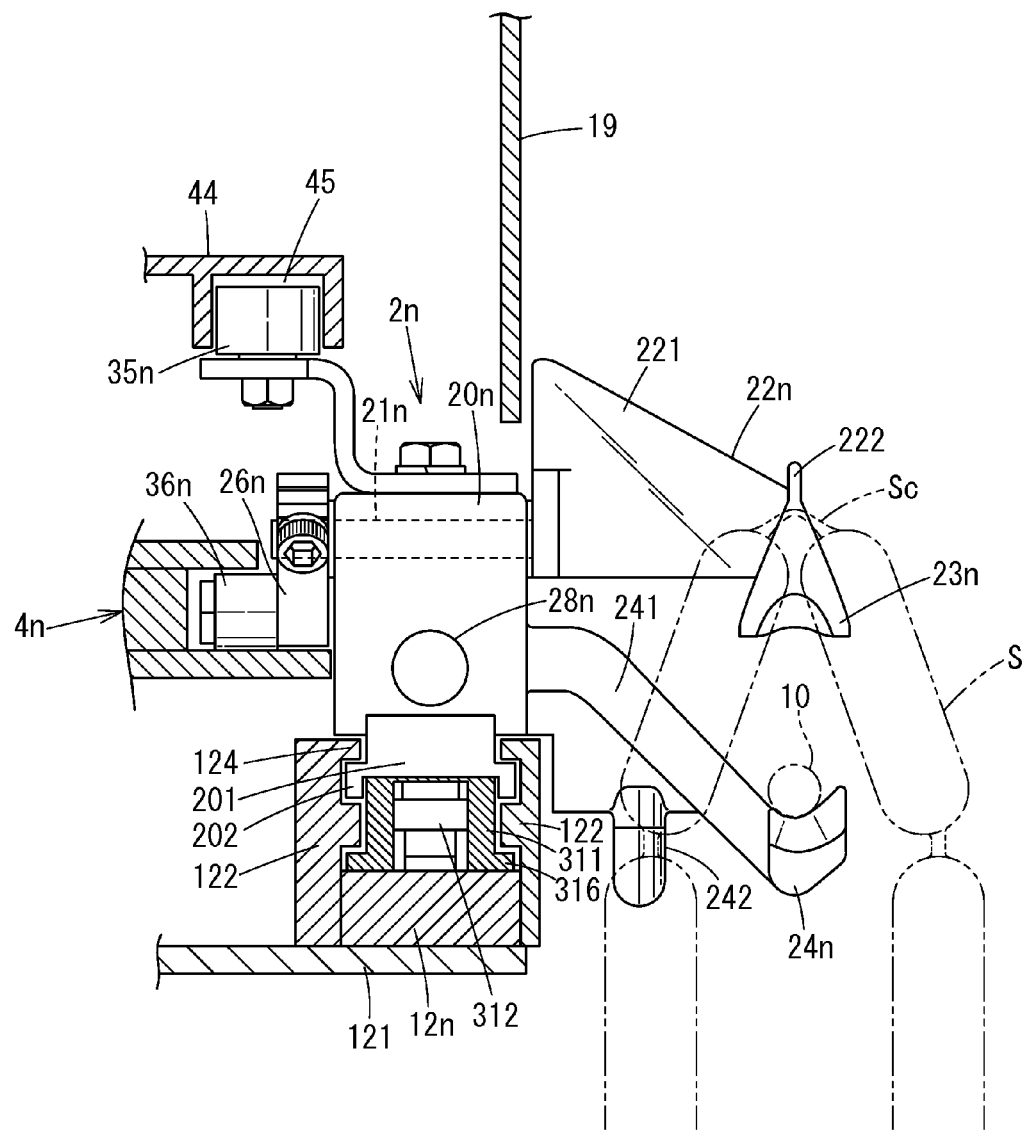
FIG. 14 is a side view of a hook unit being transferred by a conveyor chain.
Figure 15:
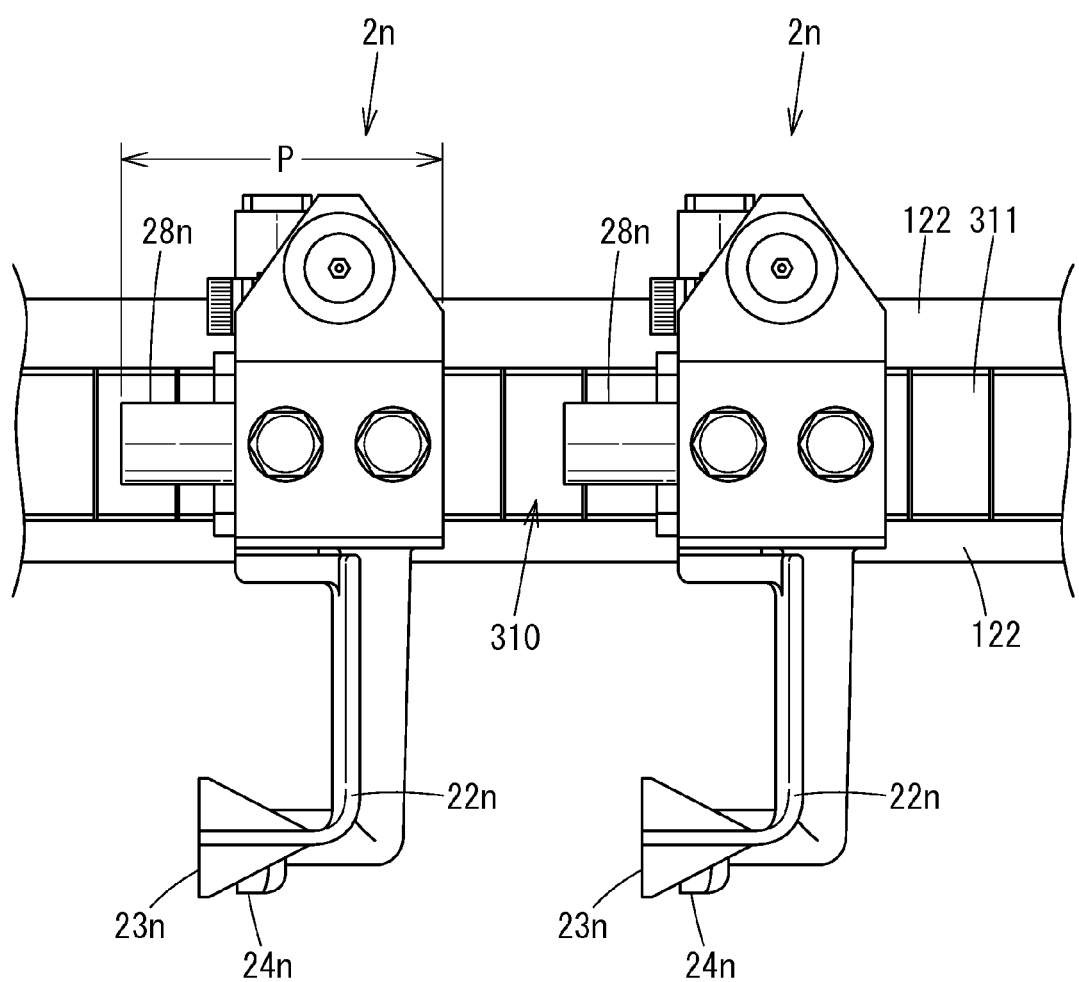
FIG. 15 is a plan view of two hook units being transferred by the conveyor chain.

As shown in FIG. 14, the rail 12n is attached to a stainless steel support plate 121, which is fixed to the base 11 (not shown). The rail 12n is created using the same synthetic resin as the links 311.

Meanwhile, a synthetic resin sliding portion 201 that has a flat surface for coming into contact with the top plate 313 is attached to the lower portion of a unit body 20n of the hook unit 2n, thus ensuring ease of sliding on the conveyor chain 310. Details of the structure of the hook unit 2n will be described later.

Guide portions 122 are attached on both the left and right sides of the rail 12n, and the conveyor chain 310 is prevented from coming up off the rail 12n due to the width of the intermediate portion being set smaller than the width of a projection 316 provided on the lower portion of the link 311.

The conveyor chain 310 is disposed so as to follow the endless rail 12n, but the timing of the transfer of the hook unit 2n is different in the areas A and B and in the areas C to F in FIG. 1. For this reason, one conveyor chain 310 is disposed in the areas A and B and a different one is disposed in the areas C to F.

As shown in FIG. 13, a pair of bridge portions 123 is disposed between the individual conveyor chains 310. The bridge portions 123 are created from the same synthetic resin as the guide portions 122, and have the same cross-sectional shape as the guide portions 122. A hook unit 2n that has been fed from the upstream conveyor chain 310 is pressed by a hook unit 2n being transferred from the upstream side, thus being moved downstream while sliding on the bridge portion 123, and is then transferred to the downstream conveyor chain 310.

As shown in FIG. 13, a bar-shaped stopper 18n is disposed at a predetermined location in the groove 43 of the guide member 42. The stopper 18n stops the movement of the hook unit 2n being transferred by the conveyor chain 310, and is configured so as to be able to move in the horizontal direction by an actuator (not shown). When the stopper 18n moves forward, the tip comes into contact with the unit body 20n (see FIG. 14) of the hook unit 2n, and thus the hook unit 2n is kept in a still state while sliding on the links 311.

Also, as shown in FIG. 13, the upper portion and the lower portion of the conveyor chain 310 is covered by a cover 46, in consideration of preventing the worker's fingers and the like from being injured by coming into contact with the conveyor chain or hook units while in motion.

In Embodiment 1, the hook units 2 being transferred by the second transfer means 6 are stopped by the stopper 18, but in the present embodiment, the hook units 2n being transferred while placed on the conveyor chain 310 are stopped by the stopper 18n.

Although the cover 46 is hidden in FIG. 13, the second transfer means 6 is disposed above the conveyor chain 310 similarly to Embodiment 1. In the present embodiment, the second transfer means 6 is used in an auxiliary manner in the transfer of the hook units 2n by the conveyor chain 310.

Specifically, in the above-described step B, the worker M2 operates the second transfer means 6 so as to transfer one rod-worth of hook units 2G1 to the areas C to E where step D is executed (see FIG. 1). At this time, although the one rod-worth of hook units 2G1 can be transferred using the conveyor chain 310, using the second transfer means 6 enables an increase in the transfer speed, and therefore the second transfer means 6 is used to transfer the one rod-worth of hook units 2G1 in the present embodiment.

Configuration and Functions of Hook Units

Next, the configuration and functions of the hook unit 2n will be described with reference to FIGS. 13 to 16B. The main differences between the hook unit 2 of Embodiment 1 and the hook unit 2n of the present embodiment are that the hook portion 22n is given the functionality of the guide portion 25, the mechanism for preventing the unit body 20n from falling off is simplified, and a few constituent members have been added in conformity with the modifications to the transfer means.

Firstly, the fact that the hook portion 22n is given the functionality of the guide portion 25 will be described. With the hook unit 2 of Embodiment 1, the guide portion 25 is attached to the unit body 20 so that a chain of sausages S suspended from the feeding opening of the sausage manufacturing apparatus 100 will be guided to the hook portion 22 (see FIG. 4).

However, experimentation showed that even if the guide portion 25 is not attached to the unit body 20, functionality almost the same as that of the guide portion 25 can be realized by changing the shape of the hook portion 22. Specifically, as shown in FIG. 13, out of the two V-shaped claws 221 and 222 of the hook portion 22n, the claw 221 on the rod side is changed so as to have a shape in which the claw is integrated with a flat plate-shaped guide.

Due to employing the hook portion 22n with the shape shown in FIG. 13, the joining portion Sc of a chain of sausages S can be smoothly suspended on the hook portion 22n even if the guide portion is not provided (see FIG. 14). Note that although the shape of the support portion 23n is somewhat different from that of the support portion 23 in Embodiment 1, there is no change in its basic functions.

Next, the mechanism for preventing the unit body 20n from falling off will be described. With the hook unit 2 in Embodiment 1, the hook unit 2 is prevented from falling off by the five rollers 31 to 35 attached to the unit body 20. According to this (see FIG. 2), the structure of the unit body 20 becomes complex, and the manufacturing cost rises.

In contrast, in the present embodiment, the unit body 20n is prevented from falling off by two members, namely the sliding portion 201 provided due to employing the conveyor chain 310, and a roller 35n provided on the upper portion of the unit body 20n.

As previously described, the sliding portion 201 is attached to the lower portion of the unit body 20n so as to ensure the ease of sliding on the conveyor chain. Projections 202 are formed on the left and right lower ends of the sliding portion 201, and the hook unit 2n is prevented from falling by sandwiching the projections 202 between projections 124 formed on the upper portions of the pair of guide portions 122.

Furthermore, a roller 35n is attached to the upper portion of the unit body 20n via an arm, and the position of the roller 35n is restricted due to being inserted into a guide member 44 that is attached to the base 11 and has a linear groove 45 formed therein, thus preventing the hook unit 2n from falling off. Employing this configuration enables simplifying the structure of the unit body 20n and reducing cost.

FIG. 15 shows a state in which hook units 2n are transferred on the rail 12n by the conveyor chain 310. The hook units 2n are individually transferred while being placed on the links 311 of the conveyor chain 310, and when the movement of the head hook unit 2n is impeded by the stopper 18n (see FIG. 13), the subsequent hook unit 2n collides with the stopped hook unit 2n to create a row of hook units 2n.

As shown in FIG. 15, an interval holding member 28n that determines the interval P between hook units is attached to a side face of the unit body 20n. Although the interval holding member 28 is configured by a bolt and nuts in the hook unit 2 of Embodiment 1, the interval holding member 28n is configured by a synthetic resin bar-shaped member in the present embodiment. Employing a synthetic resin member enables reducing impact noise when hook units 2n collide with each other.

Figure 16A:
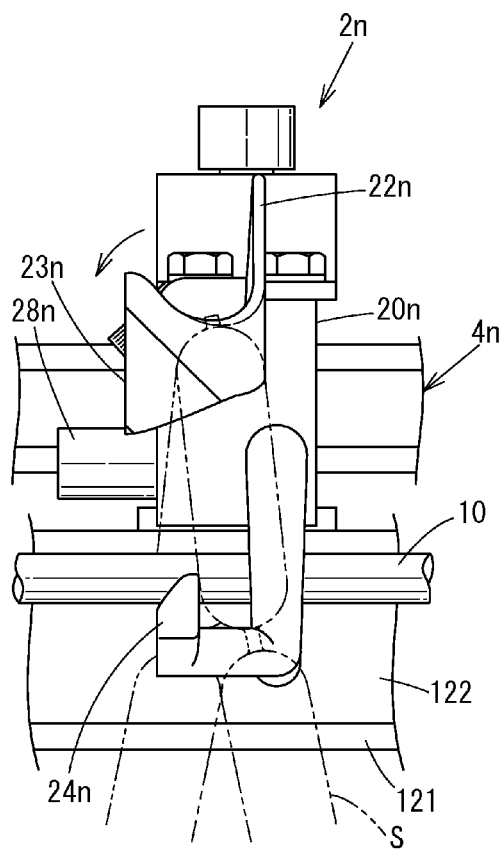
FIGS. 16A and 16B are front views for describing basic operations of a hook unit.
Figure 16B:
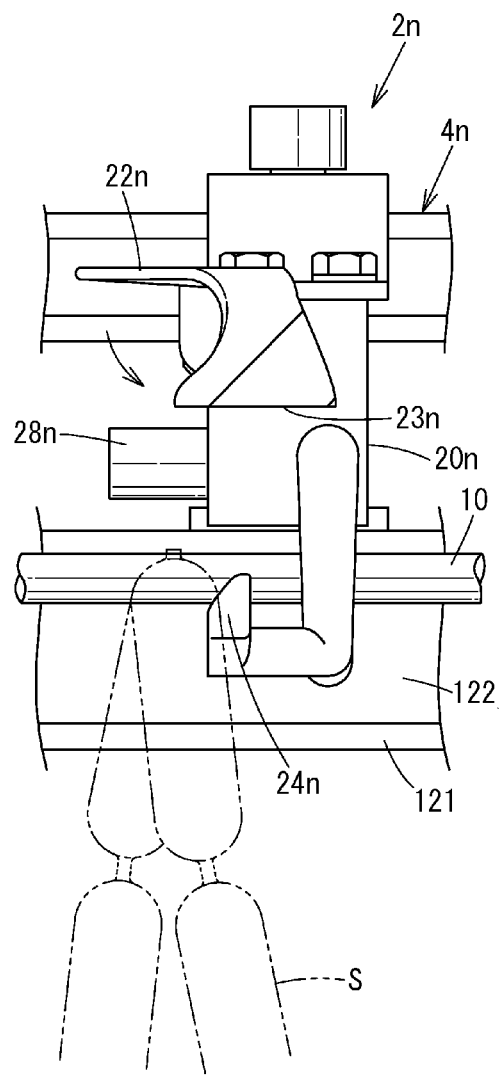

Next, operations of the hook portion 22n will be described with reference to FIGS. 16A and 16B. FIGS. 16A and 16B correspond to FIGS. 4A and 4B that illustrate operations of the hook portion 22 of Embodiment 1, and there are basically no differences from the operations of the hook portion 22. FIGS. 16A and 16B show that the hook unit 2n of the present embodiment is used to smoothly transfer a chain of sausages S from the hook portion 22n to the rod 10.

Figure 17:
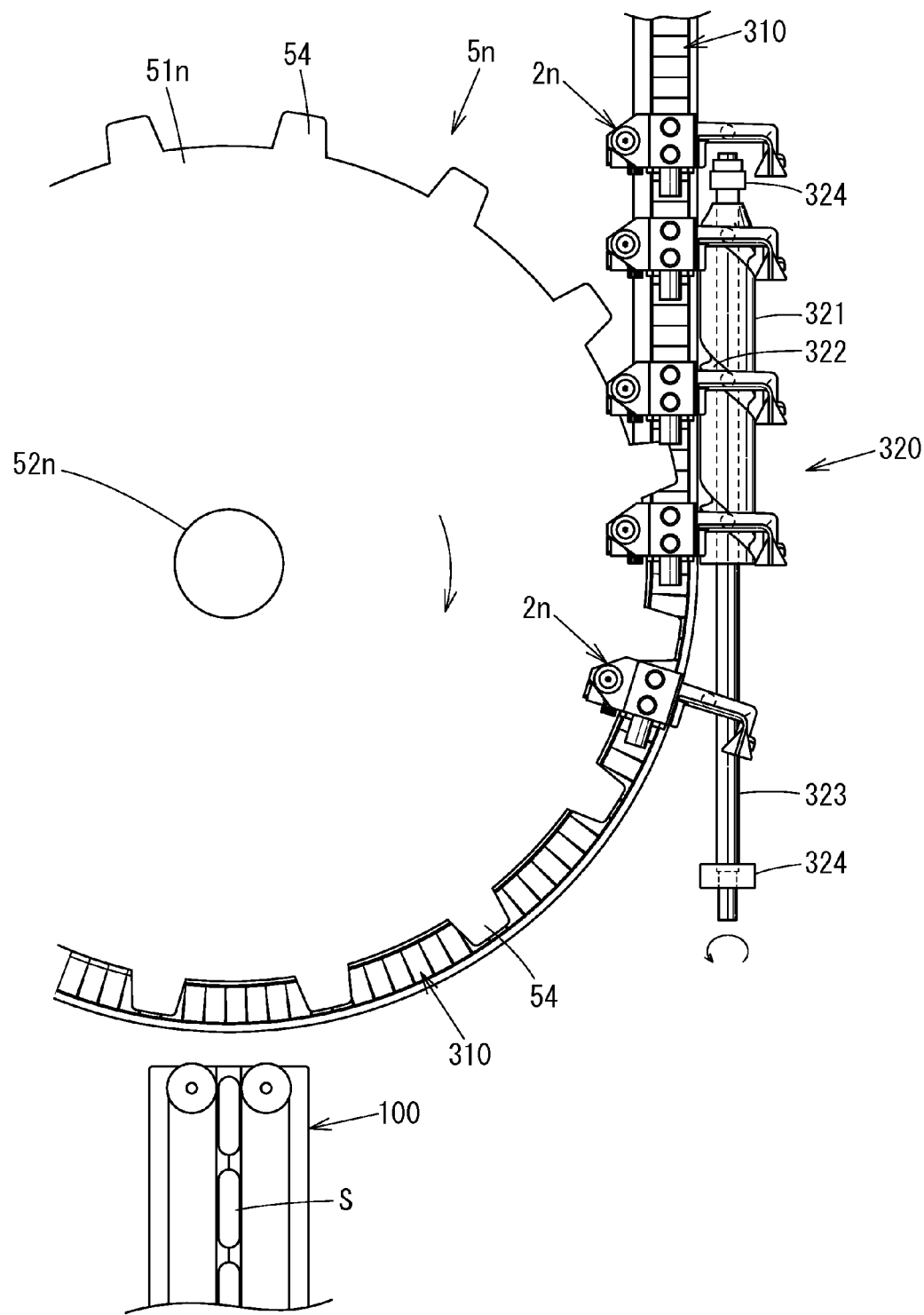
FIG. 17 is a plan view of relevant portions of the first transfer means and an interval adjustment means.
Figure 18:
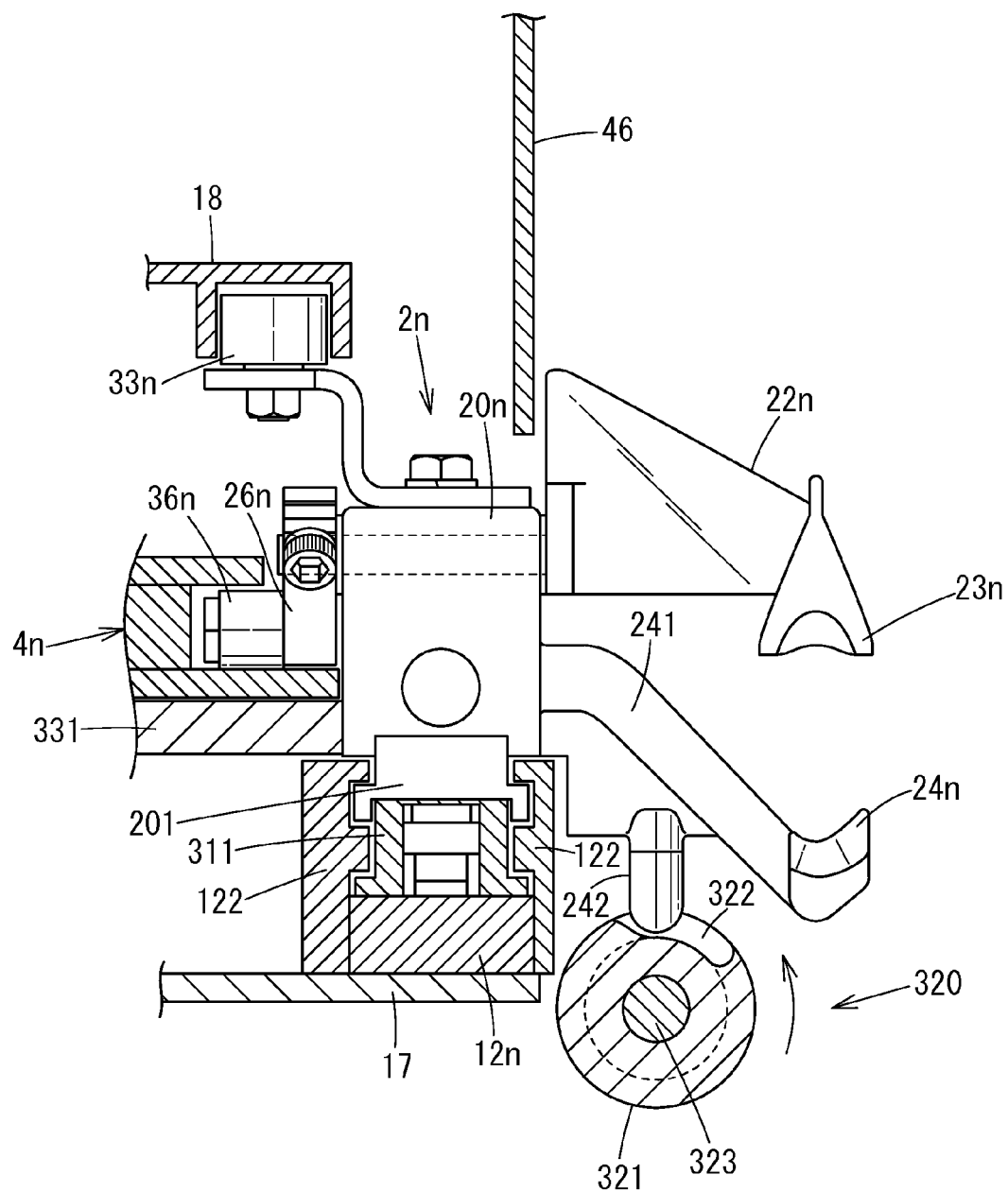
FIG. 18 is a side view for describing operations of the interval adjustment means.

Configurations and Functions of First Transfer Means and Interval Adjustment Means FIG. 17 is a plan view of relevant portions of the first transfer means 5n and the interval adjustment means 320, and FIG. 18 is a side view for describing operations of the interval adjustment means 320. Note that in order to avoid complexity in FIG. 17, portions that are not related to the first transfer means or the interval adjustment means 320 (e.g., the guide member 42 and the cover 46) are not shown.

In Embodiment 1, the first transfer means 5 is used to intermittently transfer the hook units 2 to the position where a chain of sausages S is suspended. In contrast, in the present embodiment, both the first transfer means 5n and the interval adjustment means 320 are used to intermittently transfer the hook units 2n to the position where a chain of sausages S is suspended. The following describes the first transfer means 5n and the interval adjustment means 320 of the present embodiment with reference to the drawings.

The first transfer means 5n has projections 54 formed at equal intervals on the outer circumferential portion of a disc-shaped rotating table 51n, and the turning radius of the projections 54 is substantially the same as the turning radius of the arc portion of the rail 12n. The rotating table 51n is rotated about a shaft 52n by a motor (not shown), in the direction shown by the arrow.

The projections 54 on the rotating table 51n realize functionality similar to that of the notch portions 53 in the first transfer means 5 of Embodiment 1, and the projections 54 press the unit body 20n of the hook units 2n being transferred by the conveyor chain 310 so as to transfer them to the position where a chain of sausages S fed from the sausage manufacturing apparatus 100 is suspended.

The interval adjustment means 320 adjusts the interval between the hook units being transferred by the conveyor chain 310 so as to be the same as the intervals between the projections 54 on the rotating table 51n.

The interval adjustment means 320 is configured by a screw 321, which is a synthetic resin columnar member having a spiral-shaped groove 322 formed on the outer circumferential face. A shaft 323 is inserted into the central portion of the screw 321, and the two ends of the shaft 323 are supported by a pair of bearings 324. The screw 321 rotates in the direction shown by the arrow due to the shaft 323 being rotated by a motor (not shown). Note that the pitch of the groove 322 in the screw 321 is set so as to be the same as the interval between the projections 54 on the rotating table 51n.

As shown in FIG. 18, a pin 242 is attached in a downward-facing orientation to the lower portion of the arm 241 that supports the rod receiving portion 24n of the hook unit 2n.

As shown in FIG. 17, the interval adjustment means 320 is disposed so as to follow the conveyor chain 310 in the linear portion just before the boundary between the area F and the area A (see FIG. 1). When a hook unit 2n is transferred to the area F while being placed on the conveyor chain 310, and then comes alongside the rotating screw 321, the pin 242 of the hook unit 2n engages with the groove 322 of the screw 321 as shown in FIG. 18, and thereafter the hook unit 2n moves while sliding on the conveyor chain 310 due to the rotation of the screw 321.

In this process, the interval between hook units 2n is made the same as the pitch of the groove 322, and as shown in FIG. 17, the hook units 2n are transferred on the conveyor chain 310 while being positioned between the projections 54 on the rotating table 51n. Note that the front end portion of the screw 321 is formed so as to have a somewhat smaller diameter so that the pin 242 smoothly engages with the groove 322.

When a hook unit 2n moves to the tip of the columnar member 321 as the screw 321 rotates, the pin 242 separates from the groove 322. Thereafter, the hook units 2n, which are placed on the arc-shaped conveyor chain 310, are transferred to the position for receiving a chain of sausages S from the sausage manufacturing apparatus 100 due to the unit body 20n being pressed by the projections 54 on the rotating table 51n. During this, the conveyor chain 310 plays the role of assisting the transfer of the hook units 2n by the first transfer means 5n.

In this way, after the interval between the hook units 2n is adjusted by the interval adjustment means 320, the hook units 2n are transferred by the first transfer means 5n in synchronization with the feeding speed of the chain of sausages S fed from the sausage manufacturing apparatus 100. As a result, the seventh joining portion of a chain of sausages S suspended from the feeding opening of the sausage manufacturing apparatus 100 is hung on the guide hook portion 22n of the hook unit 2n, as was described using FIG. 5.

The hook unit 2n with a chain of sausages S suspended thereon is then transferred on the rail 12n as the conveyor chain 310 moves, then enters the area B, and continues to move until its movement is stopped by the stopper 18n.

As described above, with the apparatus for hanging sausage on a rod of the present embodiment, smooth transfer of the hook units 2n is realized using the conveyor chain 310, the first transfer means 5*n*, the interval adjustment means 320, as well as the second transfer means 6, and the reliability of the apparatus for hanging sausage on a rod is further improved.

This application is based on Japanese patent application serial No. 2012-164568, filed in Japanese Patent Office on Jul. 25, 2012, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An apparatus for hanging sausage on a rod by suspending a chain of sausages, including individual sausages linked by a joining portion, so as to form loops on a plurality of hook units that move along an endless path, and by transferring the suspended chain of sausages from the hook units to a rod inserted into the loops,
   the hook units being transferred individually or as a group, the hook units each comprising:
      a unit body that moves along the path;
      a rod portion that is rotatably supported to the unit body and has attached thereto a hook portion at one end for hanging the joining portion of the chain of sausages, and a support portion that supports the chain of sausages suspended on the hook portion while keeping an angle of the chain of sausages; and
      a rod receiving portion that is attached to the unit body so as to be positioned lower than the hook portion, and has formed thereon a recessed portion in which the rod is to be placed, and
   the chain of sausages being hung on the rod by rotating the rod portions of a group of hook units having a chain of sausages of a length for hanging on one rod suspended on the hook portions, and having the rod held in the rod receiving portions, so as to cause the chain of sausages suspended on the hook portions to fall onto the rod.

2. The apparatus for hanging sausage on a rod according to claim 1,
   wherein the endless path is configured by a first rail that includes two linear portions and two arc portions, and the hook units move on the first rail.

3. The apparatus for hanging sausage on a rod according to claim 2, comprising:
   a first transfer means that transfers the hook units along the arc portion of the rail,
   wherein the first transfer means is configured by a disc-shaped rotating table that is arranged along the rail, a notch portion for engaging with a pivoting member attached to the unit body of a hook unit being formed in an outer peripheral portion of the rotating table, and
   the hook units are transferred along the arc portion of the rail by rotating the rotating table in a state in which the pivoting member is engaged with the notch portion.

4. The apparatus for hanging sausage on a rod according to claim 3,
   wherein the pivoting member is supported to the unit body so as to be able to freely pivot in a vertical plane.

5. The apparatus for hanging sausage on a rod according to claim 2, comprising:
   a second transfer means that transfers the hook units along the linear portion of the rail,
   wherein the second transfer means is configured by:
      a slider that moves on a second rail disposed along the path; and
      a second arm that is attached to the slider, does not rotate when subjected to force in any one direction, and rotates when subjected to force in the opposite direction, and
   the hook units are transferred along the path by moving the slider in a state in which the second arm is in contact with the unit bodies of the hook units.

6. The apparatus for hanging sausage on a rod according to claim 1,
   wherein an interval holding member that keeps an interval to an adjacent hook unit is attached to the unit body of each of the hook units.

7. The apparatus for hanging sausage on a rod according to claim 6,
   wherein the hook units each have a guide portion that guides a chain of sausages suspended from a sausage manufacturing apparatus to the hook portion, and the guide portion is supported to the unit body.

8. The apparatus for hanging sausage on a rod according to claim 1,
   wherein the hook units each comprise a hook portion on which a pair of claws are formed in a V shape, one of the claws being integrally formed with a flat plate-shaped guide that guides the chain of sausages suspended from a sausage manufacturing apparatus.

9. The apparatus for hanging sausage on a rod according to claim 1, comprising:
   an elongated elevating means that has a groove parallel with the path,
   wherein a first arm is attached to another end of the rod portion in a direction orthogonal to a lengthwise direction of the rod portion, and
   a roller attached to a tip of the arm is engaged with the groove of the elevating means, and the rod portion is rotated in a clockwise or counter-clockwise direction by causing the elevating means to move up/down.

10. The apparatus for hanging sausage on a rod according to claim 1, comprising:
    a rod transfer means that retrieves one rod from a location in which a plurality of rods are stored, and transfers the one rod to the rod receiving portion of a hook unit,
    wherein the rod transfer means is configured by:
       a rod separation member that separates and retrieves one rod from the rod storage location;
       a guide member that guides the transfer of the separated rod; and
       a rod transfer member that has a recessed portion for placement of the transferred rod, and rotates about a shaft, and
    the rod transfer member is rotated so as to cause the rod placed in the recessed portion to fall into the rod receiving portion of a hook unit.

11. The apparatus for hanging sausage on a rod according to claim 1, comprising:
    a rod ejection means that retrieves a rod placed in a rod receiving portion with a chain of sausages suspended thereon from the rod receiving portion and ejects the rod to a rod loading table,
    wherein the rod ejection means has a third arm that swivels about a shaft and retrieves the rod placed in the rod receiving portion from the rod receiving portion by pushing the rod upward from below.

12. The apparatus for hanging sausage on a rod according to claim 1, comprising:

a third transfer means that transfers a hook unit that is empty due to a chain of sausages having been removed from the hook portion, wherein the third transfer means is configured by a belt that moves along the path, and a pair of timing pulleys that move the belt, and the hook unit is transferred with use of frictional force by causing the belt to come into contact with the hook unit.

13. The apparatus for hanging sausage on a rod according to claim 12, wherein an arc-shaped coil spring is attached to the unit body of each of the hook units on a back face side, and the coil spring is caused to come into contact with the belt.

14. The apparatus for hanging sausage on a rod according to claim 2, comprising:

a fourth transfer means for transferring the hook units along the path, wherein the fourth transfer means is configured by:
a conveyor chain that moves over the first rail, and
a pair of sprockets that move the conveyor chain, and the hook units are transferred in a state of being placed on the conveyor chain.

15. The apparatus for hanging sausage on a rod according to claim 14, wherein the fourth transfer means is disposed in each area having a different transfer timing.

16. The apparatus for hanging sausage on a rod according to claim 14, comprising:

a fifth transfer means for transferring the hook units on the conveyor chain arranged along the arc portion of the path, wherein the fifth transfer means is configured by a disc-shaped rotating table having a plurality of projections formed at equal intervals in an outer peripheral portion, and the hook units are transferred along the conveyor chain due to the unit bodies of the hook units being pressed by the projections.

17. The apparatus for hanging sausage on a rod according to claim 14, comprising:

an interval adjustment means for adjusting an interval between a plurality of hook units that are to be transferred by the conveyor chain disposed in the linear portion of the path, wherein the interval adjustment means is configured by a screw that has a spiral-shaped groove formed on an outer circumferential face of a columnar member, and rotates about a shaft, and a pin attached to an arm that supports the rod hanging portion of the hook unit engages with the groove.

18. A method of hanging sausage on a rod by suspending a chain of sausages, including individual sausages linked by a joining portion, so as to form loops on a plurality of hook units that move along an endless path, and by transferring the suspended chain of sausages from the hook units to a rod inserted into the loops, the hook units being transferred individually or as a group,
the hook units each comprising:
a unit body that moves along the path;
a rod portion that is rotatably supported to the unit body and has attached thereto a hook portion at one end for hanging the joining portion of the chain of sausages, and a support portion that supports the chain of sausages suspended on the hook portion while keeping an angle of the chain of sausages; and
a rod receiving portion that is attached to the unit body so as to be positioned lower than the hook portion, and has formed thereon a recessed portion in which the rod is to be placed, the method comprising:
arranging a first group of hook units on an upstream side in a movement direction, a chain of sausages being suspended on the hook portions in the first group of hook units, and the number of hook units in the first group corresponding to a chain of sausages of a length for hanging on one rod,
arranging a second group of hook units on a downstream side in the movement direction, a chain of sausages suspended on the hook portions in the second group of hook units having been removed, a rod being placed in the rod receiving portions in the second group of hook units, and the number of hook units in the second group corresponding to a chain of sausages of a length for hanging on one rod,
transferring the rod placed in the rod receiving portions in the second group of hook units to the rod receiving portions in the first group of hook units by transferring the first group of hook units and the second group of hook units downstream in the movement direction in a state of preventing movement of the rod held in the rod receiving portions in the second group of hook units, and
thereafter rotating the rod portions in the first group of hook units so as to cause the chain of sausages suspended on the hook portions to fall onto the rod.

19. The method of hanging sausage on a rod according to claim 18, wherein a rod that is placed in the rod receiving portions in the first group of hook units and has a chain of sausages suspended thereon is retrieved from the rod receiving portions and ejected to a rod loading table with use of an arm that swivels about a shaft.

* * * * *